(12) United States Patent
Singh et al.

(10) Patent No.: US 9,639,820 B2
(45) Date of Patent: *May 2, 2017

(54) SYSTEMS, STRUCTURES, AND PROCESSES FOR INTERCONNECTED DEVICES AND RISK MANAGEMENT

(71) Applicant: Alert Enterprise, Fremont, CA (US)

(72) Inventors: Subrat Narendra Singh, Newark, CA (US); Srinivasa Kakkera, Newark, CA (US); Kiu Li, Pleasanton, CA (US); Prathap Sakala, Fremont, CA (US)

(73) Assignee: Alert Enterprise, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,070

(22) Filed: Apr. 25, 2016

(65) Prior Publication Data

US 2016/0267408 A1 Sep. 15, 2016

Related U.S. Application Data

(63) Continuation-in-part of application No. 14/210,016, filed on Mar. 13, 2014, now Pat. No. 9,324,119.

(Continued)

(51) Int. Cl.
*G06F 21/00* (2013.01)
*G06Q 10/06* (2012.01)
(Continued)

(52) U.S. Cl.
CPC ......... *G06Q 10/0635* (2013.01); *G06N 7/005* (2013.01); *G06Q 10/06* (2013.01); *G06Q 50/265* (2013.01); *H04W 4/005* (2013.01)

(58) Field of Classification Search
CPC . G06Q 10/0635; G06Q 50/265; H04W 4/005; G06N 7/005
See application file for complete search history.

(56) References Cited

U.S. PATENT DOCUMENTS 8,418,249 B1 4/2013 Nucci et al.
8,955,076 B1 2/2015 Friedman et al.
(Continued)

OTHER PUBLICATIONS

Krishna, et al., "Solving Big Data with SAP HANA and Hadoop", (2012) URL: http://www.saphana.com/community/blogs/blog/2012/08/27/solving-big-data-with-sap-hana-and-hadoop, 1-2.

*Primary Examiner* — Mahfuzur Rahman
(74) *Attorney, Agent, or Firm* — Michael A. Glenn; Perkins Coie LLP

(57) ABSTRACT

Techniques are provided that produce a risk profile consisting of a risk score and trends of risk scores across devices and sensors in a machine-to-machine (M2M) or Internet of things (IOT) environment. For example, a device is assigned a risk score which is based on baseline factors such as expected network packets between two devices, normal network packets, access to critical devices, authorized access requests from one device to another device, normal communications to a device, and the critical ports of a device; access to and conflicts across physical, logical, and operational systems; historical and current usage of these systems, and anomalies from normal behavior patterns. Techniques encompass risk management by computing a risk score in a timely fashion in accordance with an architecture that enables achieving the required scaling necessitated by the huge number of devices in the machine-to-machine (M2M) or Internet of things (IOT) environment.

3 Claims, 36 Drawing Sheets

Related U.S. Application Data

(60) Provisional application No. 61/800,351, filed on Mar. 15, 2013.

(51) Int. Cl.
  *H04W 4/00*  (2009.01)
  *G06N 7/00*  (2006.01)
  *G06Q 50/26* (2012.01)

(56) References Cited

U.S. PATENT DOCUMENTS

| | | |
|---|---|---|
| 2003/0065613 A1 | 4/2003 | Smith |
| 2003/0229525 A1 | 12/2003 | Callahan et al. |
| 2009/0037323 A1* | 2/2009 | Feinstein ............... G06Q 20/10 705/38 |
| 2010/0125911 A1 | 5/2010 | Bhaskaran |
| 2011/0119218 A1 | 5/2011 | Lay et al. |
| 2011/0131122 A1 | 6/2011 | Griffin et al. |
| 2011/0258558 A1 | 10/2011 | Montagna et al. |
| 2014/0282856 A1 | 9/2014 | Duke et al. |
| 2015/0112710 A1* | 4/2015 | Haber ................. G06F 19/3431 705/2 |
| 2015/0199010 A1 | 7/2015 | Coleman et al. |
| 2015/0207813 A1 | 7/2015 | Reybok et al. |

* cited by examiner

AlertEnterprise True Convergence of Physical and Logical Security     Settings | About | Contact | Sign Out

| Home | Insight | Risk Library | Reports | Dashboards | Setup | Help |

Welcome Steve Waugh

Risk Score by Actor

Business Unit: [IT ▼]    Filter by [Usage ▼]

| Actor Name and Actions | User Risk Score | Action Risk Score | Date |
|---|---|---|---|
| ▸ ☐ Alice Norton | 55 | | 01/22/2012 |
| ▸ ☐ Lemmy Tails | 51 | | 01/22/2012 |
| ▸ ☐ Simon Harris | 48 | | 01/22/2012 |
| ▸ ☐ Terrance Redman | 53 | | 01/22/2012 |
| ▸ ☐ David Wigfall | 44 | | 02/05/2012 |
| ▸ ☐ Nicole Whisler | 39 | | 02/05/2012 |
| ▸ ☐ Daniel Saad | 50 | | 02/05/2012 |
| ▸ ☐ Steven Watson | 53 | | 02/05/2012 |
| ▸ ☐ Connie Payne | 51 | | 01/22/2012 |
| ▸ ☐ Raymond Russell | 41 | | 01/22/2012 |
| ▸ ☐ Calvin Harris | 40 | | 01/22/2012 |
| ▸ ☐ Philip Nguyen | 38 | | 02/05/2012 |
| ▸ ☐ Anne Christenson | 42 | | 02/05/2012 |

AlertEnterprise True Convergence of Physical and Logical Security      Settings| About | Contact | Sign Out

| Home | Insight | Risk Library | Reports | Dashboards | Setup | Help |

Welcome Steve Waugh

Identity > Identity Center > View/Modify Identity > Summary

- Summary
- Profile
- Training
- Screening
- Roles
- Accounts
- Ownerships
- Delegation
- History
- Risk Score & Behavior Search [ First name or last name or department or email address ] 🔍   Advanced Search
Back to Search Results (812)

View / Modify Identity - Summary

View, modify identity by selecting an action below or create a request by selecting request category from dropdown.

Identity Action: [ View Information | ▼ ] GO      Create Request: [ Request Type | ▼ ] [ Request | ▼ ] GO

Alice Norton
Badge ID: FP3451
Contractor
Location: Sacramento, CA
anorton@domainname.com

[ 55 ]
RISK LEVEL

LOW — MEDIUM — HIGH    [ Details ]

Screening

| ScreeningName | Status | Date | Last Recertified | Recertified By |
|---|---|---|---|---|
| Background Check | Passed | 04/20/2010 | 04/20/2011 | Mary Groves |
| Drug Test | Passed | 04/20/2010 | 04/20/2011 | Mary Groves |
| ICS Training | Passed | 04/20/2010 | 04/20/2011 | Mary Groves |
| Yearly Compliance Training | Passed | 04/20/2010 | 04/20/2011 | Mary Groves |

[ Back ]                                                                                  [ Next ]

| AEDEVUSER_ARSC_RISKSCORE_ENTITY_HIS | |
|---|---|
| P + ID | NUMBER (19) |
| JOB_ID | NUMBER (19) |
| ENTITY_TYPE | VARCHAR2 (255 CHAR) |
| ENTITY_PK | VARCHAR2 (255 CHAR) |
| ENTITY_DISP_NAME | VARCHAR2 (255 CHAR) |
| RISK_SCORE | NUMBER (19) |
| JOB_RUN_DATE | TIMESTAMP |
| ⚲ SYS_C00172213 (ID) | |
| ◆ SYS_C00172213 (ID) | |

| AEDEVUSER_ARSC_RISKSCORE_AUDIT_HIS | |
|---|---|
| P + ID | NUMBER (19) |
| RISK | VARCHAR2 (255 CHAR) |
| F RISK_HIS_ENTITY_ID | NUMBER (19) |
| RISK_FACTOR | VARCHAR2 (255 CHAR) |
| RISKSCORE | NUMBER (19) |
| ⚲ SYS_C00172210 (ID) | |
| ◆ SYS_C00172210 (ID) | |

| AEDEVUSER_ARSC_SIMULATION_ENTITY | |
|---|---|
| P + ID | NUMBER (19) |
| U RSS_JOB_ID | NUMBER (19) |
| U RSS_ENTITY_ID | VARCHAR2 (255 CHAR) |
| U RSS_ENTITY_TYPE | VARCHAR2 (255 CHAR) |
| RSS_RISK_SCORE | NUMBER (19) |
| ⚲ SYS_C00172220 (ID) | |
| ◆ SYS_C00172221 (RSS_JOB_ID,RSS_ENTITY_ID,RSS_ENTITY_TYPE) | |
| ◆ SYS_C00172220 (ID) | |
| ◆ SYS_C00172221 (RSS_JOB_ID,RSS_ENTITY_ID,RSS_ENTITY_TYPE) | |

| AEDEVUSER_ARSC_SIMULATION_OBJ | |
|---|---|
| P + ID | NUMBER (19) |
| RSS_JOB_ID | NUMBER (19) |
| RSS_COUNT | NUMBER (19) |
| RSS_ENTITY_TYPE | VARCHAR2 (255 CHAR) |
| RSS_DATE | TIMESTAMP |
| RSS_RISK_SCORE | FLOAT(126) |
| RSS_RISK_SCORE_COUNT | NUMBER(10) |
| ⚲ SYS_C00172222 (ID) | |
| ◆ SYS_C00172222 (ID) | |

*FIG. 10E*

AlertEnterprise! Welcome Gary Higgins

Settings | About | Contact | Sign Out
Powered by AlertEnterprise

Home | Reports | Setup | Help

Access

Profile
Training
Screening
Roles
Accounts
Ownerships
Delegation
History

Profile

Tip — Lorem ipsum dolor sit amet, consectetur adipisicing elit, sed do eiusmod tempor consectetur do eiusmod tempor....

RISK LEVEL: 55

LOW — MEDIUM — HIGH

View Details

My ID: 1234
First Name: Lemmy
Middle: S
Last Name: Tails

Department: Warehouse
Location: Bldg 1A, Fremont
Job Title: Forklift Operator
Manager: Roberto Lui Cancel | Apply

(Big Data Architecture)

(Technical Architecture)

(Asset Risk On a GIS Map)

Asset Risk Score Visualization

SYSTEMS, STRUCTURES, AND PROCESSES FOR INTERCONNECTED DEVICES AND RISK MANAGEMENT

CROSS REFERENCE TO RELATED APPLICATIONS

This patent application is a continuation-in-part of U.S. patent application Ser. No. 14/210,016, filed Mar. 13, 2014, which claims priority from U.S. Provisional Patent Application No. 61/800,351, filed Mar. 15, 2013, the entirety of each of which is incorporated herein by this reference thereto.

BACKGROUND OF THE INVENTION

Technical Field

This invention relates generally to the field of computer-related methodologies for handling complex risk and security challenges of systems of an enterprise. More specifically, this invention relates to systems, structures, and processes for interconnected devices and risk management.

Description of the Related Art

Insider threat is always present and manifests itself in many ways. A malicious insider has the potential to cause more damage to an organization and has many advantages over an outside attacker. For example, they have legitimate and often privileged access to facilities and information, have knowledge of the organization and its processes, and know the location of critical or valuable assets. Insiders may know how, when, and where to attack and how to cover their tracks. For instance, an individual who was given two weeks' notice before being terminated and who is disgruntled can access a facility during off hours. Today, a disgruntled employee, i.e. an insider threat, can wreak havoc on IT systems, financial system, physical facilities, etc., because not all insider threats are monitored correctly, if at all.

In the past few years a new paradigm has emerged referred to as the Internet Of Things ("IOT"). IOT has received massive attention and adoption. IOT is combination of the interconnection of devices and sensors, etc. (things) and their data exchange (referred to as machine to machine (M2M)). M2M also includes but is not limited to remote control capability. An IOT environment enables devices to become smart. Usage of IOT is in many different industries such as energy and utility, healthcare, manufacturing, smart cities, wearable, and automotive to name a few. As per some estimates, by 2020 there will be 20 to 30 billion interconnected devices.

SUMMARY OF THE INVENTION

Techniques are provided that produce a risk profile consisting of a risk score and trends of risk scores across devices and sensors in a machine-to-machine (M2M) or Internet of things (IOT) environment. For example, a device is assigned a risk score which is based on baseline factors such as expected network packets between two devices, normal network packets, access to critical devices, authorized access requests from one device to another device, normal communications to a device, and the critical ports of a device; access to and conflicts across physical, logical, and operational systems; historical and current usage of these systems, and anomalies from normal behavior patterns. Techniques encompass risk management by computing a risk score in a timely fashion in accordance with an architecture that enables achieving the required scaling necessitated by the huge number of devices in the machine-to-machine (M2M) or Internet of things (IOT) environment.

The identity and asset risk scoring framework provides an excellent foundational mechanism for an IOT risk management mechanism. However, because IOT includes machine-to-machine communication between a fairly large number of devices, the data volume requirement is huge and requires a scalable, high throughput and robust mechanism. Thus, in an embodiment additional risk contributing factors for IOT are incorporated into the existing identity and asset risk scoring contributing factors.

BRIEF DESCRIPTION OF THE DRAWINGS

FIG. 3 is a sample screen shot showing risk score by actor as a drill down, according to an embodiment of the invention;

FIG. 4 is a sample screen shot of a summary view for viewing or modifying an identity, according to an embodiment of the invention;

FIG. 6 is a sample screen shot of a roles view for viewing or modifying the roles of an identity, according to an embodiment of the invention;

FIG. 7 is a sample screen shot of a training view for viewing or modifying the training/certification of an identity, according to an embodiment of the invention;

FIG. 8 is a sample screen shot of a screening view for viewing or modifying the types of screening associated with an identity, according to an embodiment of the invention;

FIG. 9 is a sample screen shot of a behavioral patter view for viewing the user risk score built on behavior, activity, access, and usage, according to an embodiment of the invention;

FIG. 10A-10F is a schematic diagram of the data schema, according to an embodiment of the invention;

FIG. 15 is an identity view with the risk score at drill down level 3, according to an embodiment of the invention;

FIG. 18 is a mock-up configuration screen of various input factors, according to an embodiment of the invention;

FIG. 19 is a mockup of resource reconciliation policy page where an event trigger can be configured as a risk, according to an embodiment of the invention;

FIG. 25 is a sample screen shot showing risk score details, according to an embodiment of the invention;

DETAILED DESCRIPTION OF THE INVENTION

Techniques are provided that produce a risk profile consisting of a risk score and trends of risk scores across entities such as user identities and other objects. For example, an identity is assigned a risk score which is based on baseline factors such as HR attributes, such as training and screening status; access to and conflicts across physical, logical, and operational systems; historical and current usage of these systems, as well as anomalies from normal behavior patterns. Techniques herein encompass the management of a risk profile ("behavior profile") for each entity, e.g. identity, and maintains a risk score that is correlated with behavior, e.g. an individual's behavior, to track anomalies or irregularities in every day routines of the entity, e.g. individual.

Figure 1:
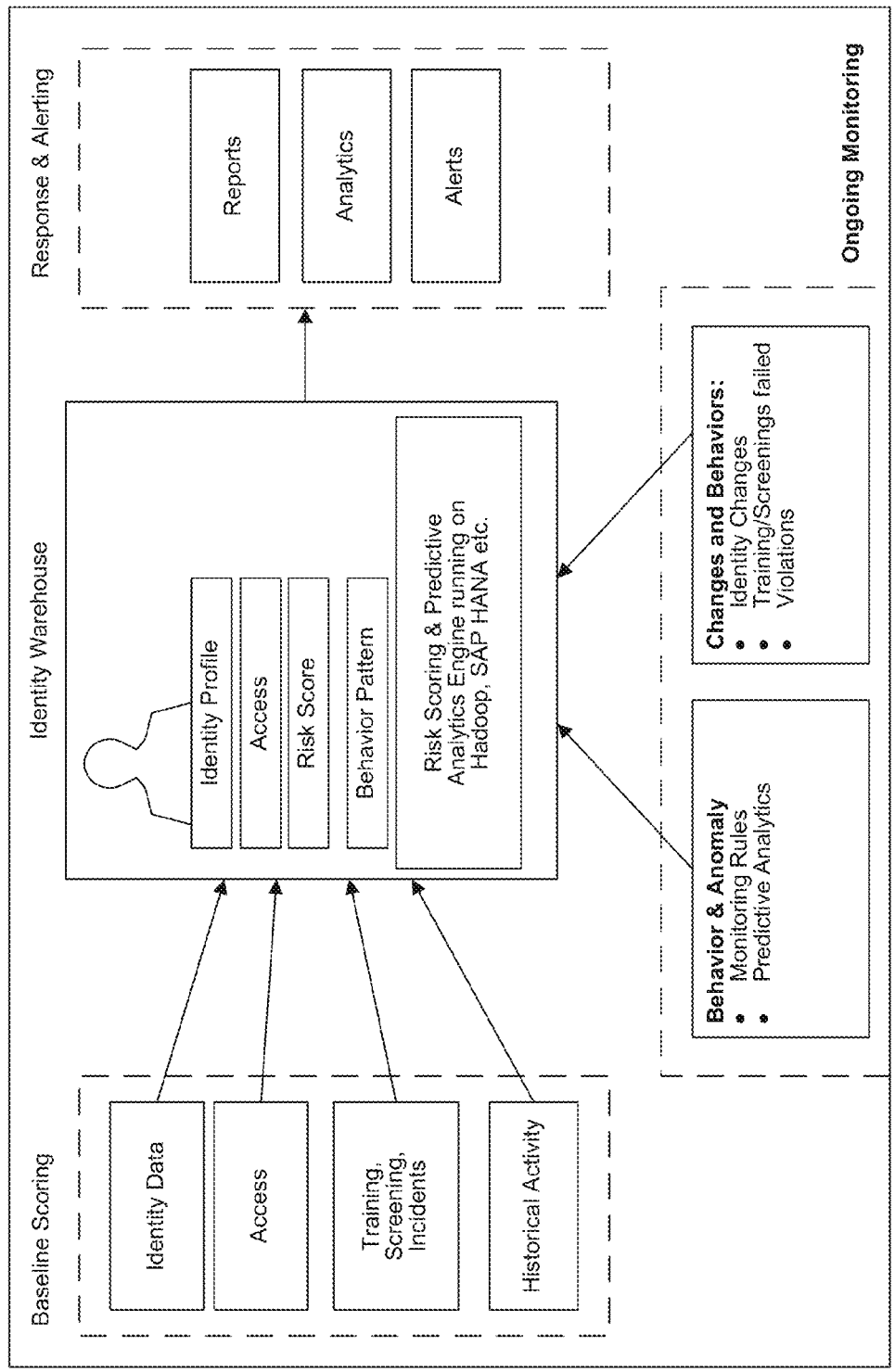
FIG. 1 is a schematic diagram of a high level risk scoring solution architecture, according to an embodiment of the invention.

An embodiment of the invention can be understood with reference to FIGS. 1-9. FIG. 1 is a schematic diagram of a high level risk scoring solution architecture. Baseline scoring data including but not limited to identity data, access data, training, screenings, and incidents data, and historical activity data are inputted into an identify warehouse. Identity warehouse hosts, but is not limited to hosting, an identity profile, access information, risk score information, and behavior pattern data regarding individuals. As well, identity warehouse contains a risk scoring and predictive analytics engine that runs on Hadoop, SAP HANA, etc. It should be appreciated that the particular details are by way of example only and are not meant to be limiting.

The embodiment also is configured for ongoing monitoring. Behavior and anomaly processes and data enable but are not limited to enabling monitoring riles and providing predictive analytics. Changes and behaviors processes and data enable but are not limited to enabling or monitoring identity changes, training and screenings failures, and violations.

The embodiment is also configured for responding to the monitoring processes by a response and alerting component. The component is configured to provides but is not limited to providing reports, analytics, and alerts.

Figure 2:
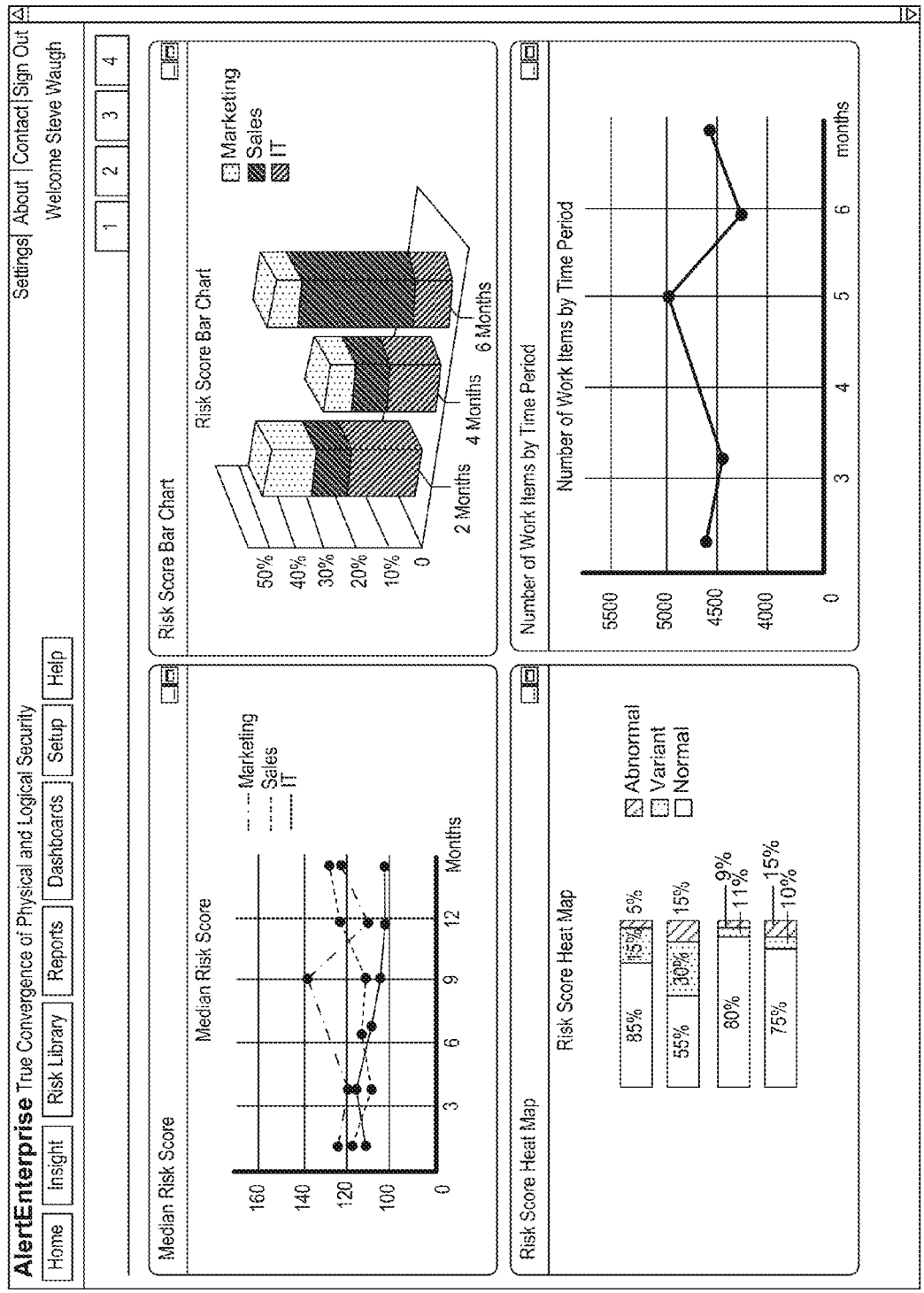
FIG. 2 is a compilation of four sample screen shots of the risk scoring dashboard, according to an embodiment of the invention.

An embodiment of the invention can be understood with reference to FIG. 2, which is a compilation of four sample screen shots of the risk scoring dashboard. The four reports are color-coded and include median risk score, risk score bar chart, risk score heat map, and number of work items by time period.

An embodiment of the invention can be understood with reference to FIG. 3, a sample screen shot showing risk score by actor as a drill down. For business unit, IT, a list of actors, their respective user risk scores, and a data are displayed.

Figure 4:
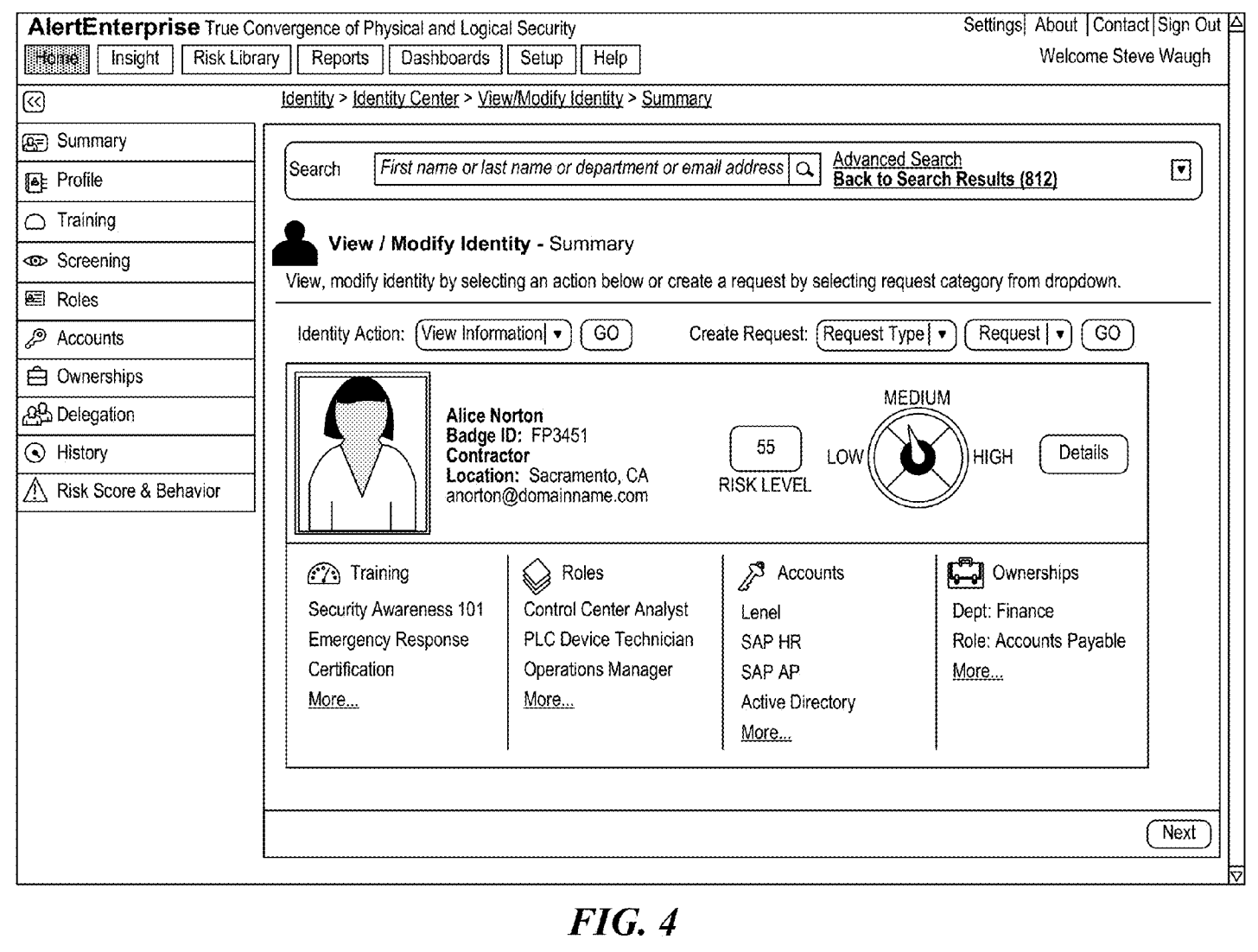

An embodiment of the invention can be understood with reference to FIG. 4, a sample screen shot of a summary view for viewing or modifying an identity. A summary page for a particular contractor is displayed. On this page, the user can view and modify the identity by selecting an action or create a request by selecting a request category from a dropdown box.

Figure 5:
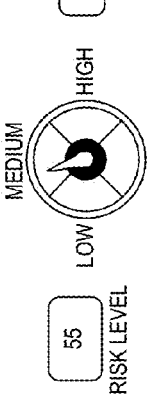
FIG. 5 is a sample screen shot of a profile view for viewing or modifying the profile of an identity, according to an embodiment of the invention.
Figure 10A:
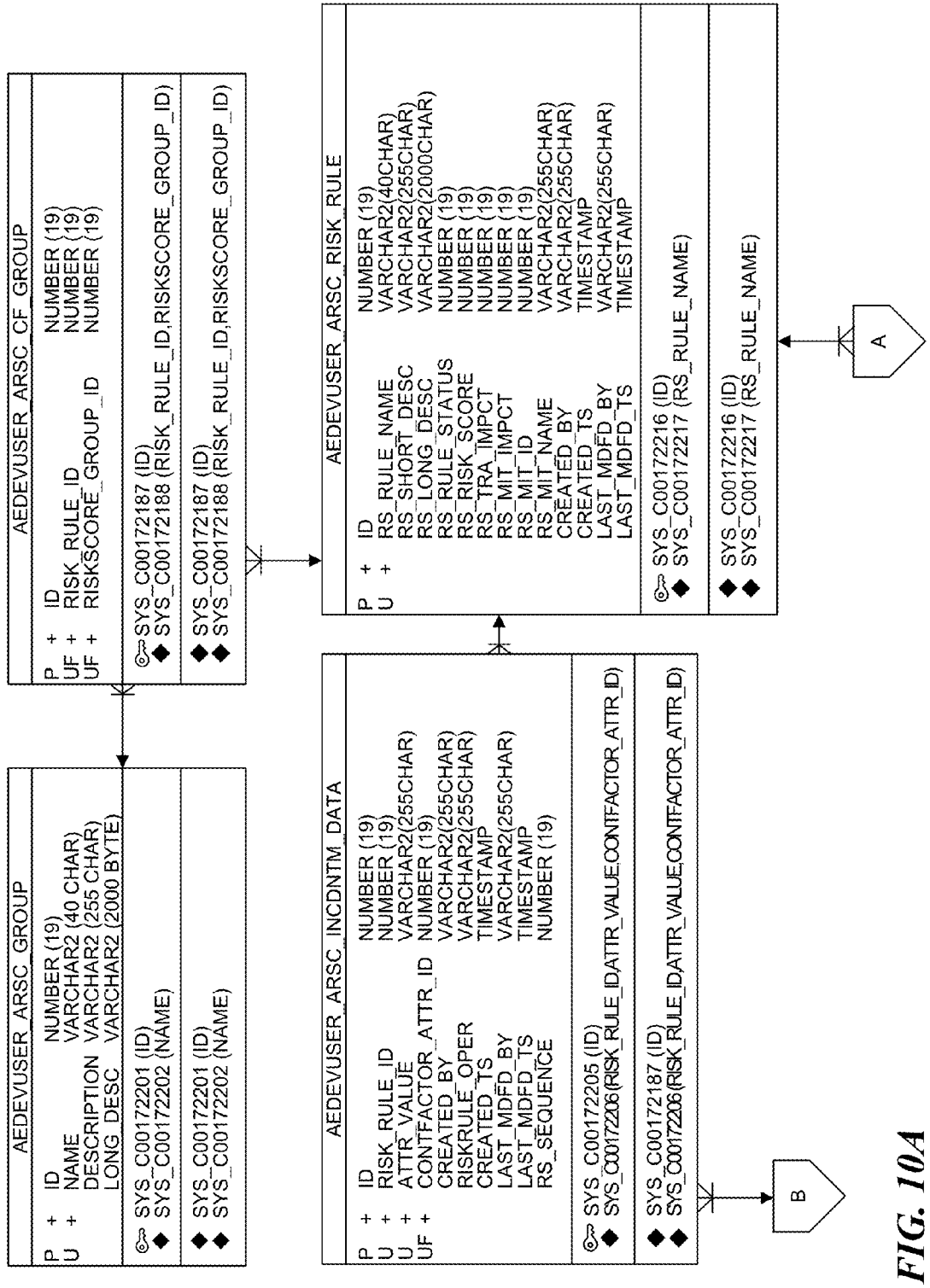
Figure 10B:
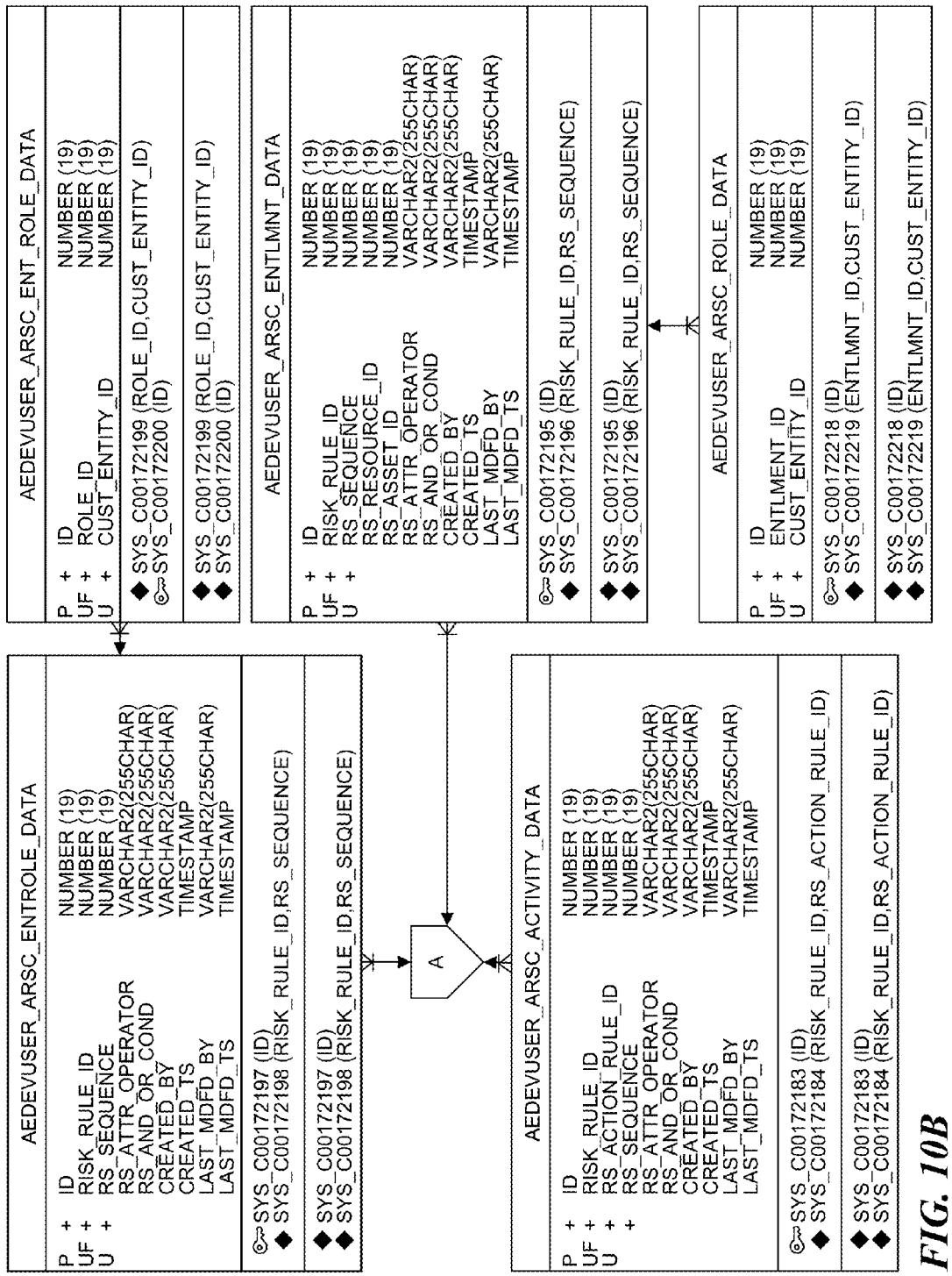
Figure 10C:
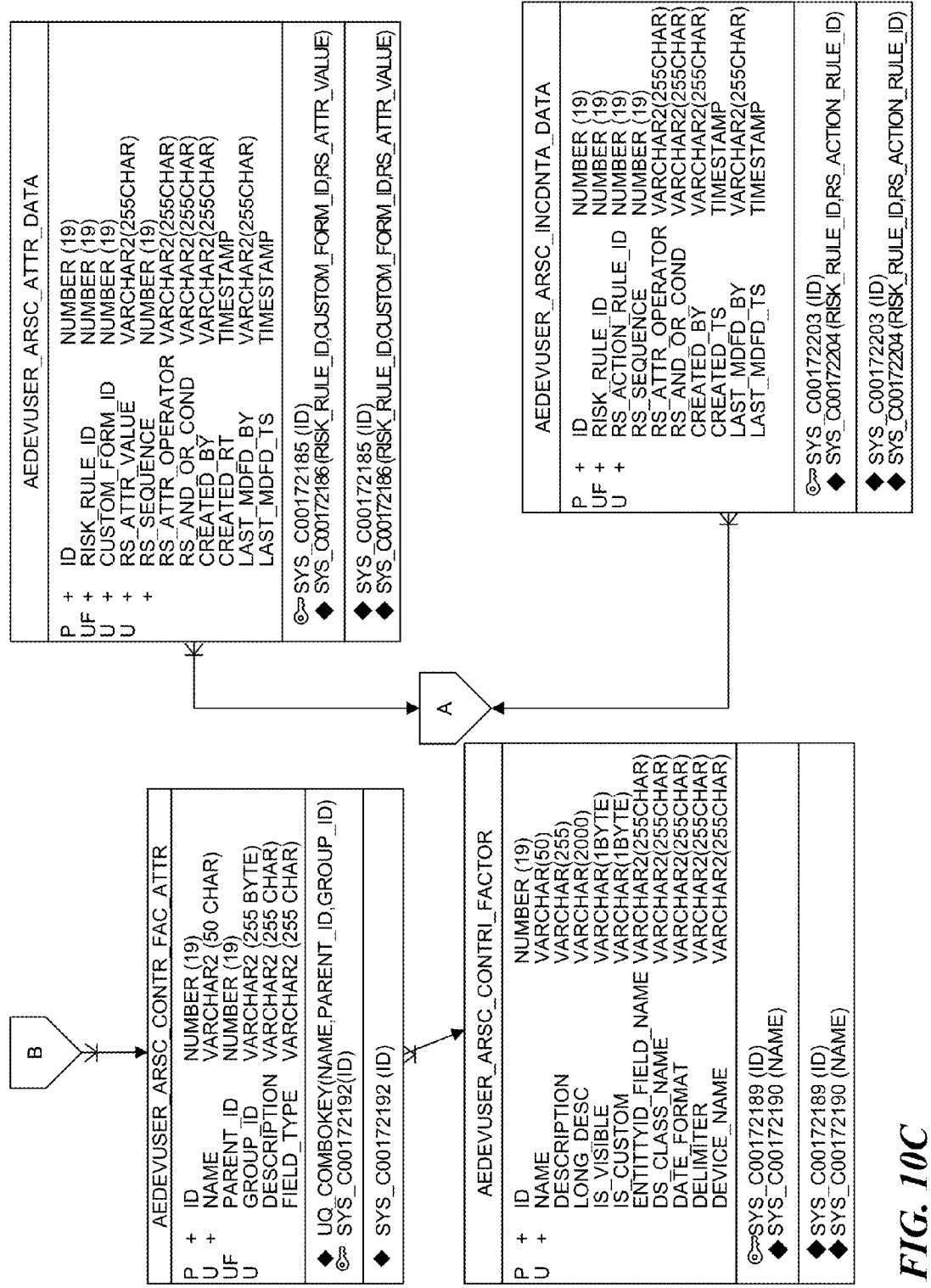
Figure 10D:
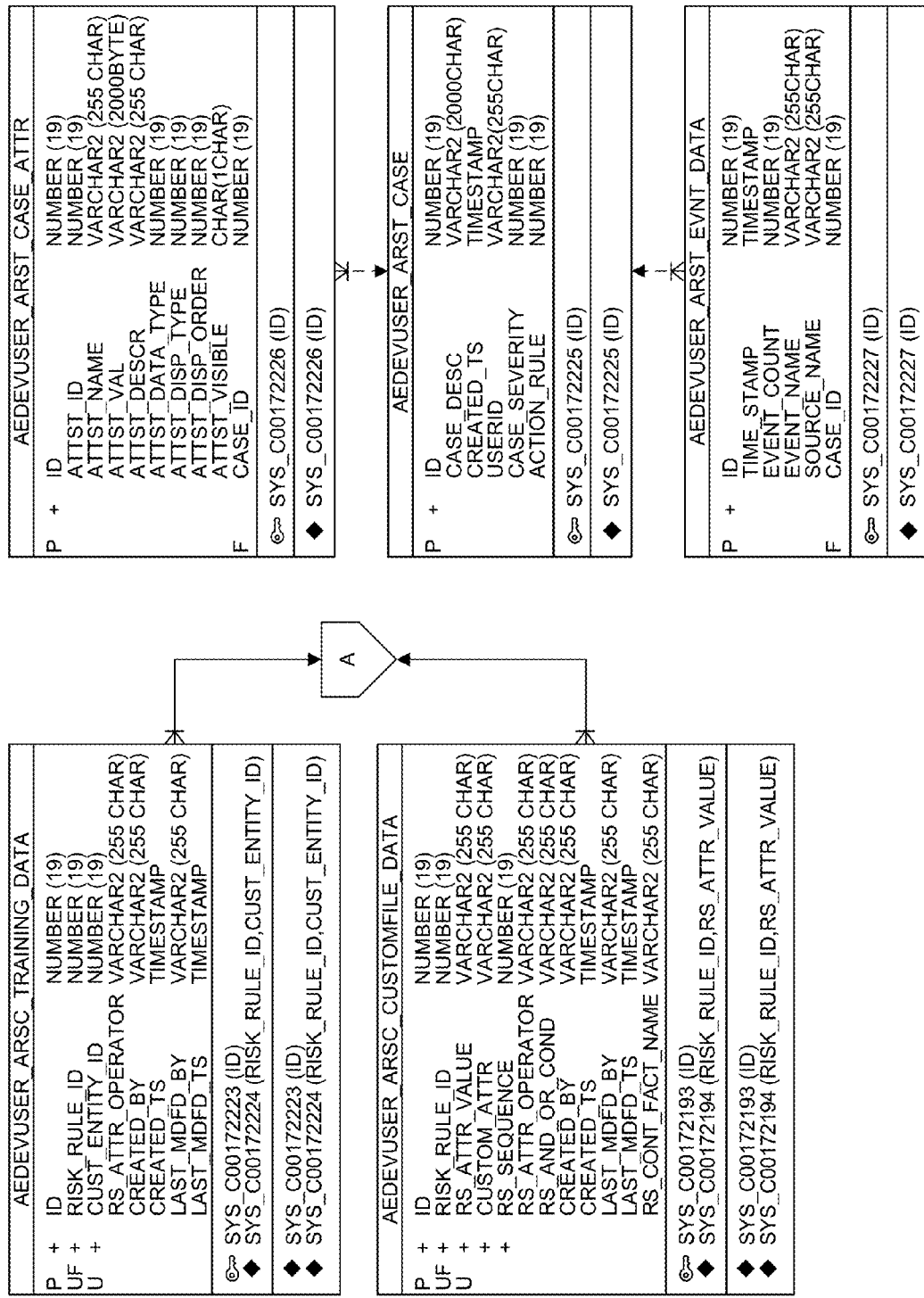
Figure 10F:
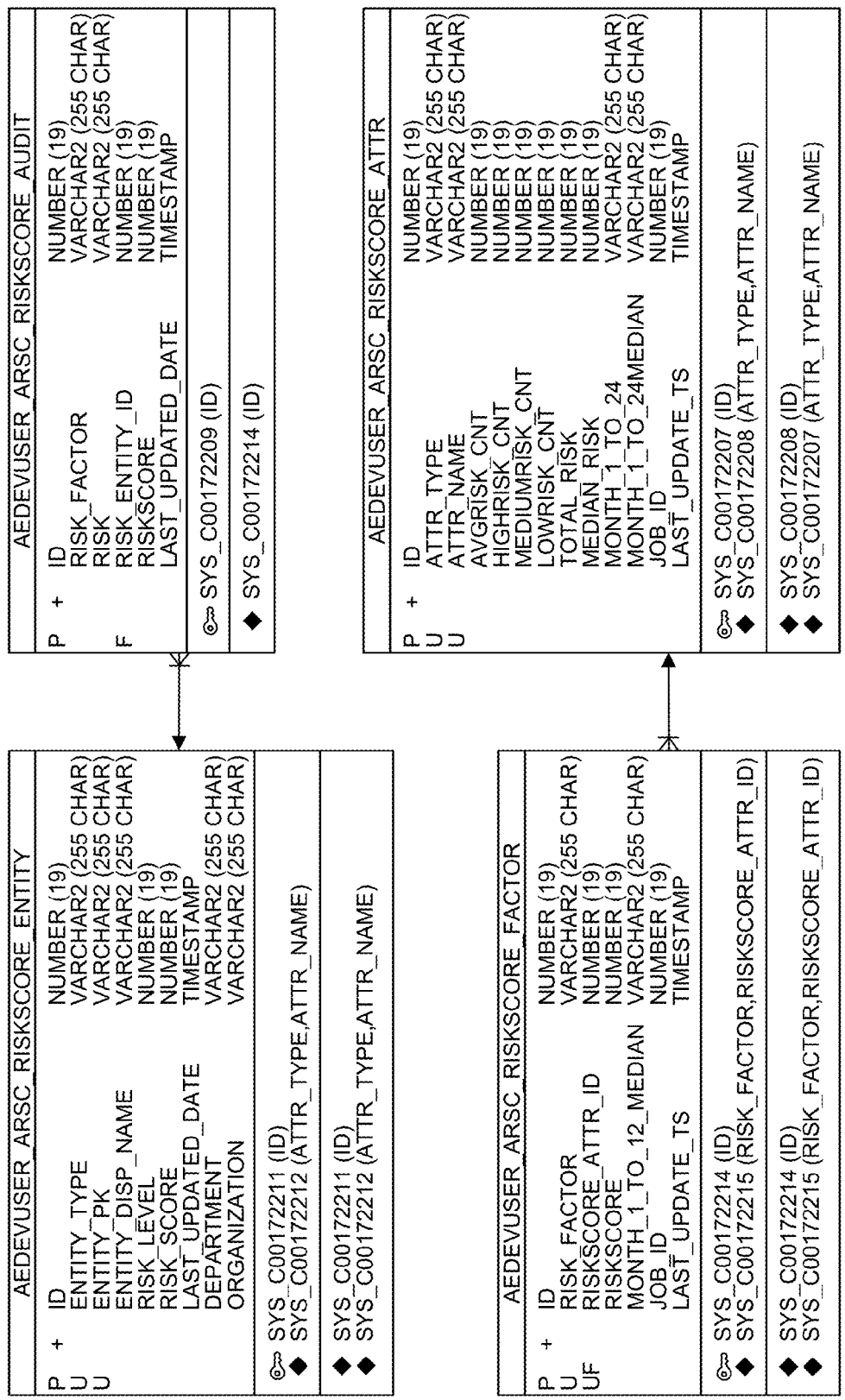

An embodiment of the invention can be understood with reference to FIG. 5, a sample screen shot of a profile view for viewing or modifying the profile of an identity. The profile information can include but is not limited to including name, social security number (optionally disguised so as not to be shown), badge identification number, employee type, and so on.

Figure 6:
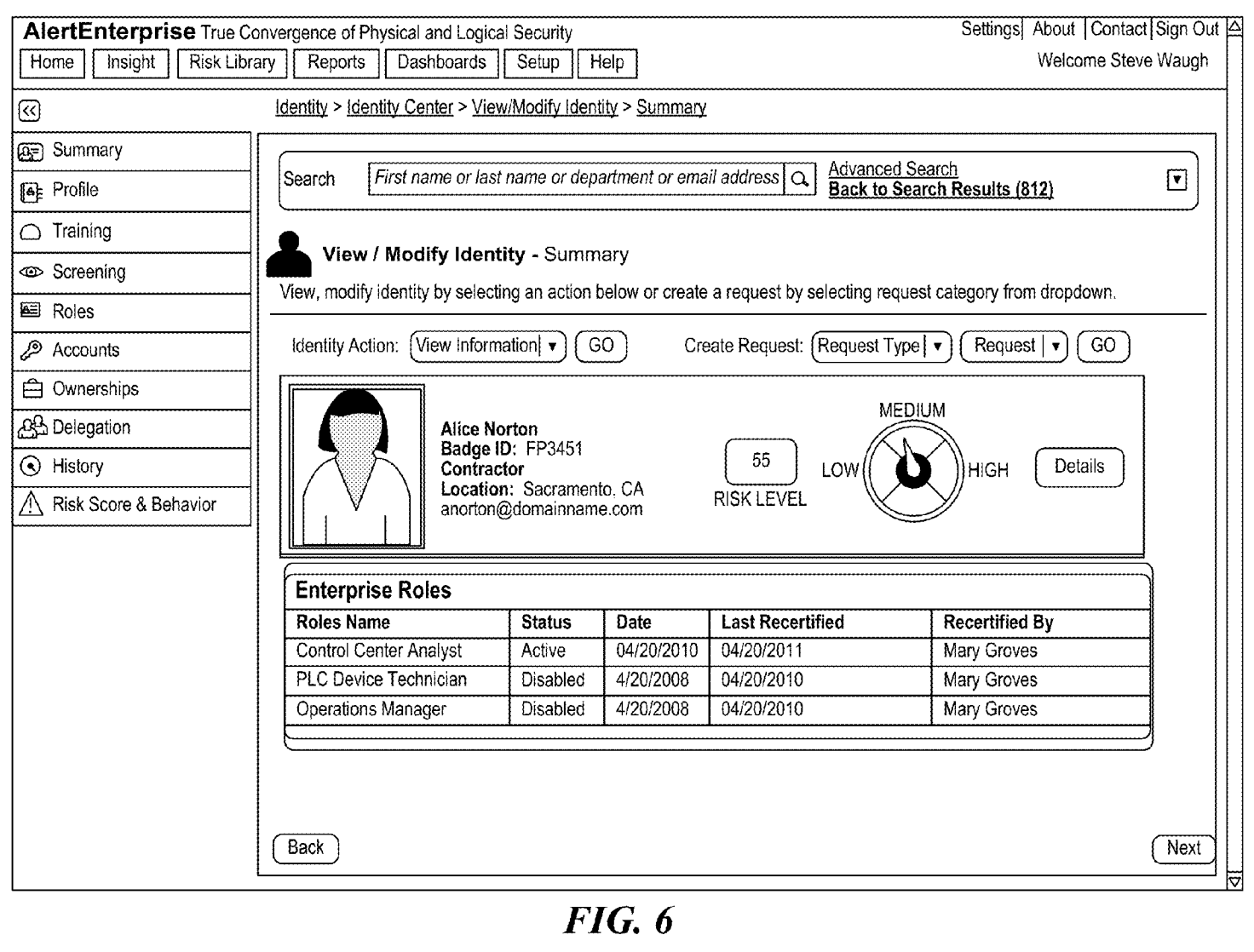

An embodiment of the invention can be understood with reference to FIG. 6, a sample screen shot of a roles view for viewing or modifying the roles of an identity. For example, generated and displayed are roles names, status, data, last recertified, and recertified by. It should be appreciated that these details are by way of example only and are not meant to be limiting.

Figure 7:
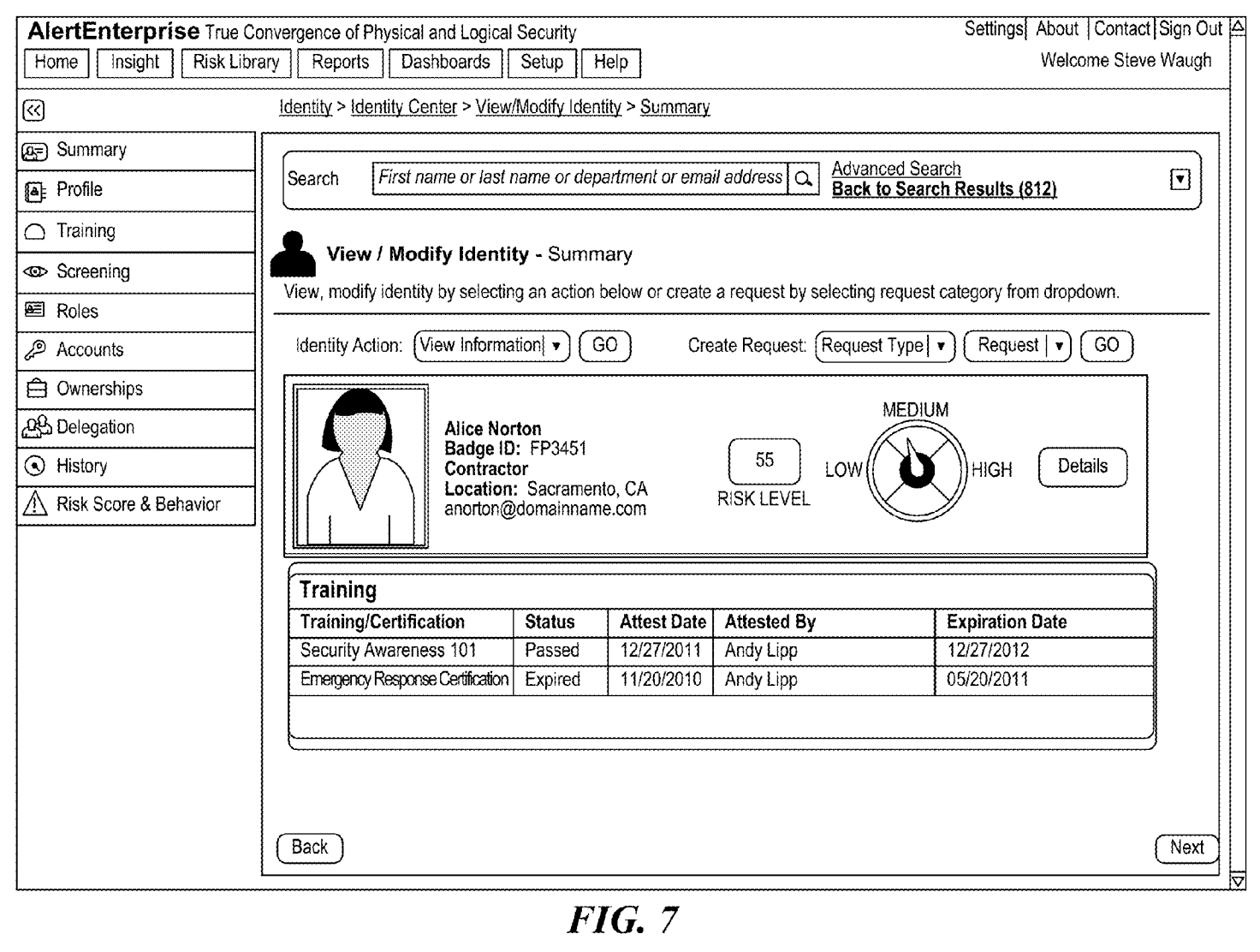

An embodiment of the invention can be understood with reference to FIG. 7, a sample screen shot of a training view for viewing or modifying the training/certification of an identity. By way of example only and not meant to be limiting, generated and displayed are training or certification, status, attest date, attested by, and expiration date.

An embodiment of the invention can be understood with reference to FIG. 8, a sample screen shot of a screening view for viewing or modifying the types of screening associated with an identity. By way of example only and not meant to be limiting, generated and displayed are screening name, status, date, last recertified, and recertified by. Examples of types of screenings are background checks, drug test, ICS training, yearly compliance training, and the like.

Figure 9:
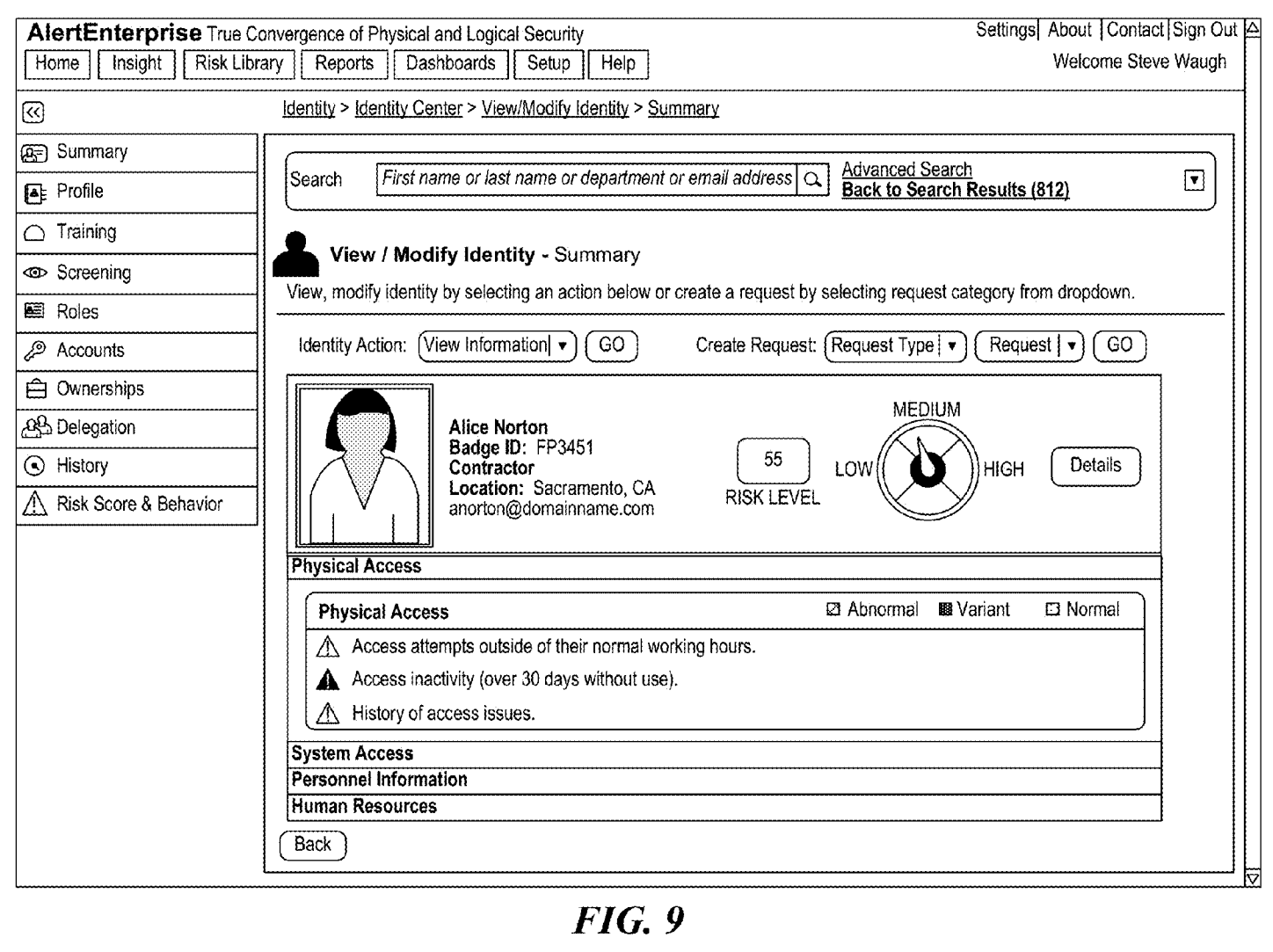

An embodiment of the invention can be understood with reference to FIG. 9, a sample screen shot of a behavioral patter view for viewing the user risk score built on behavior, activity, access, and usage. Determined and displayed are information regarding physical access system access, personnel information, and human resources information. For the physical access display, three types of alerts are shown such as access attempts outside of their normal working hours, access inactivity (over 30 days without use), and history of access issues.

An embodiment of the invention can be understood with reference to FIG. 10A-FIG. 10F, a schematic diagram of the data schema. For example, data block are defined for but are not limited to a risk rule, activity data, risk score factors, and so on. For ease of reading, FIG. 10 has been split into six parts, namely, FIG. 10A to FIG. 10F.

Exemplary Risk Profile And Risk Score Requirements

An exemplary embodiment can include but is not limited to including the following components or processes from a user's perspective, but not limited to being from a user's perspective. It should be appreciated that particular details are by way of example only and that one skilled in the art would readily recognize that certain substitutions, additions, or omissions can be made without altering the scope of the invention.

Data Source Integration.

In an embodiment, the risk engine is capable of being a stand-alone product. It has its own data infrastructure capable of processing heavy volumes of quick reads and writes. It is required to interface with the Identity Warehouse as its main source of information to compute an identity's risk score and profile. The risk engine has its own data structure to capture data related to behavioral patterns such as time of entry in an access point, badge-out times, as well as remediation data such as alerts and actions. The component is configured to work with other vendors' identity warehouses.

Dashboards.

As an end-user or admin who has been given permission to run the risk dashboard, he or she desired to be able to run a heat-map chart dashboard referred to herein as Risk Scores By Business Unit. This could be location, cost center, division, etc. This configuration allows the user to select Business Units to chart. The aggregated median risk scores for those departments are charted, color-coded, with legends and the percent distribution. The heat map regions are clickable, which invokes a popup window of another pie chart that breaks down the distribution of contributing factors, e.g. training or usage, for the selected department. There is further drill down, i.e. when the pie slice is clicked, another window pops up with a statistical distribution chart. Further drill down can happen when the user clicks on a section of the distribution chart, for example, top 2%. Only the department members who fall on that percentage appear in the list. When a name is clicked, it can open another window that shows the user the Identity View of the person, which can also show the drill-down of why the person has that score. One skilled in the art can readily refer to FIGS. 1-9 as well as FIGS. 11-19, described hereinbelow.

It should be appreciated that the drill-downs are role-based and consider security permissions, i.e. the person cannot drill down to data that he/she does not have permissions to view.

An end-user or admin allowed to run dashboards is able to run a pie-chart of company-wide distribution of contributing factors. Depending on the end-user or admin's permissions, he or she is able to drill down on those contributing factors into specific distribution.

Figure 17:
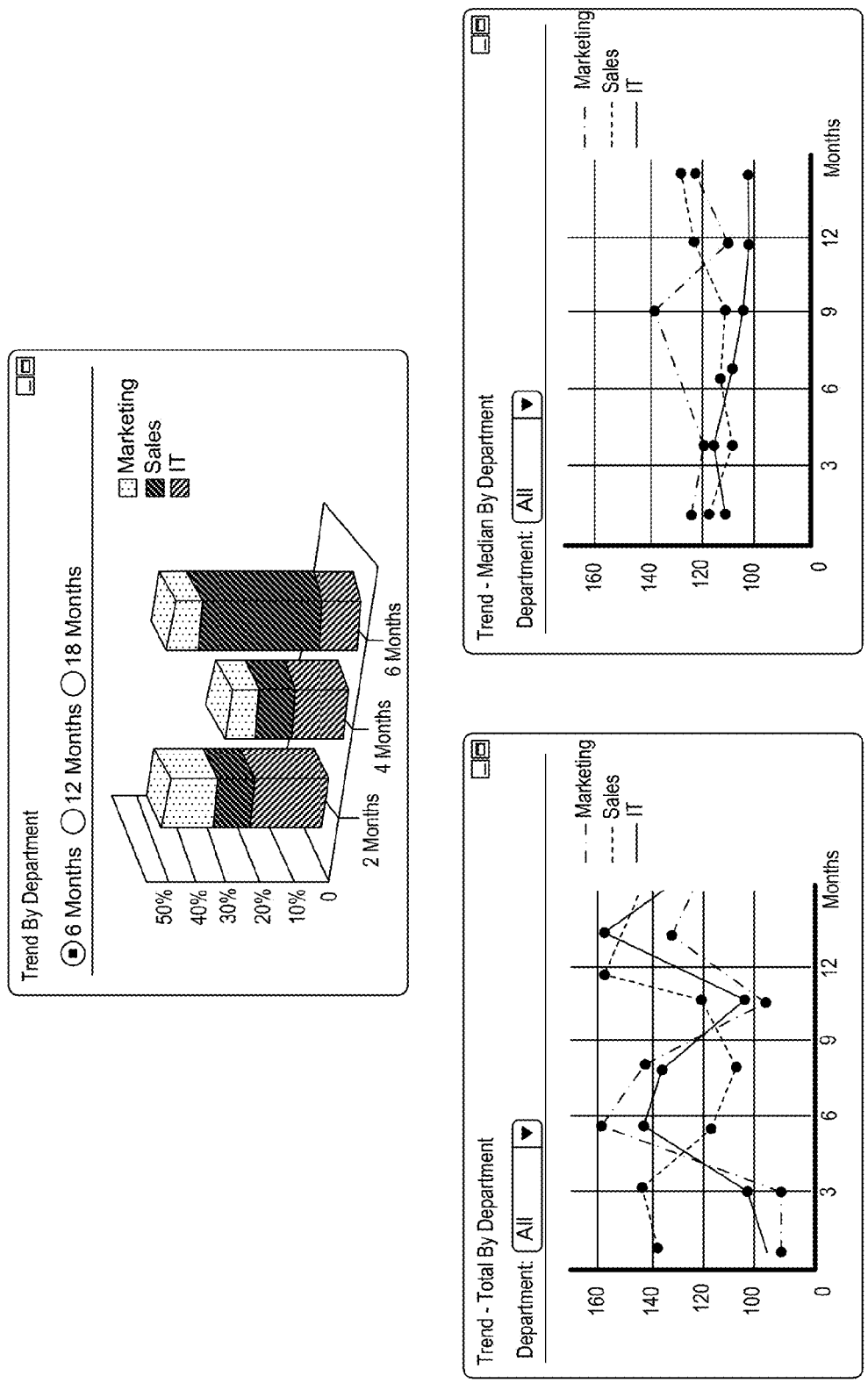
FIG. 17 is a schematic diagram showing mock-ups of comparative dashboards by department, according to an embodiment of the invention.

An end-user or admin has the option to run a comparative departmental or other organizational (cost center, location, division etc.) trend analysis chart on selected departments. For example, the chart can be a line graph with the risk score totals per department as shown in FIG. 17.

An end-user or admin is able to run a dashboard that allows the end user or admin to view over x months, a department or organization's (cost center, location, division etc.) risk contributing factors. Time and other criteria are selectable as filters/scope as shown in FIG. 17.

An end-user or admin is able to run a comparative trend charts on selected departments (cost center, location, division etc.). For example, the chart may be a line graph with the median or average score per department. The x-axis can represent the time as shown in FIG. 17.

It should be appreciated that a median is the middle number when all scores are sorted from lowest to highest. For example, if the scores are 1,3,6,8,9, the median is 6. In the case of an even number of scores, the two middle numbers are averaged out. An average is the total of all scores divided by the number of scores.

Change of Access.

As an approver of a change of access, the end-user can view the number of points a person's risk score will increase when the end-user approves the request, as part of the approval process. The end-user can also see the current risk score of the person. See for example FIG. 16. The system is configured such that real-time modifications of the risk score via access changes, mitigations and associated trainings to reduce the risk score are allowed.

A change in role or access can swing a risk score. This event is detected during a change of access resulting from a user/data/role reconciliation process.

Events such as accounts added, modified, deleted, enabled or disabled directly in a resource may impact the risk score. An embodiment provides for checkboxes for enabling risk calculation in a Resource Reconciliation Policy page, for example in FIG. 19. The configuration of the score assignments are in a setup configuration page.

Risk Remediation.

An embodiment provide means to reduce risk by:
Removal of access;
Training assignments; and
Mitigation assignment (after the fact).

An embodiment provides a pre-defined (out of the box) rule that can be used by a Certification process, e.g. Certify project by AlertEnterprise, when the risk exceeds a defined threshold.

An embodiment has pre-defined (out of the box) rule that can be used by a process, e.g. a Certify project, to incorporate risk into the list of users for a project. For example, an embodiment contemplates the following functionality:
recertify access to all users with critical-risk score monthly;
recertify access to all users with high-risk quarterly;
notify manager of access to all users with medium risk quarterly;
initiate alerts with associated standard operating procedures(sop); and
send email to manager of risky access.

An embodiment provides an out of the box sample implementation of a certify process, e.g. a Certify project, that warns managers of training about to expire, example, in 15 days.

The solution allows for bulk mitigation actions, such as ad-hoc certification, for high-risk user populations discovered via reporting or analytics.

Risk Calculation.

An embodiment provides an indication in a configuration page that Risk Scoring is enabled or disabled. If enabled is checked, the application warns the admin to make sure he needs to do these steps before the risk score will get enabled (1) allocate risk points for each contributing factor in the configuration page (2) runs a job that calculates the risks for all identities for the first time. Without these steps, the risk scores may not get the baseline points. If the Risk Scoring is disabled, then no calculations are being done throughout the application. If silent mode, calculations are being carried out, but actions and alerts are not enabled.

An admin can configure Identity/user profile attributes from authoritative sources such as HR/Contractor databases (DB) that are to be used to influence a person's baseline risk score, such as location, department, employee status. Corresponding points can be entered in the configuration screen. The admin is enabled to enter composite/complex rules such as for example:

If location="SJC", then risk=4. If Location="OAK", then risk=4.

But if location is both "SJC" AND "OAK", then risk=6.

An admin is able to configure attributes related to training and screening validity and status as contributing factors to a risk score. The admin can enter their corresponding points in the configuration page.

Examples of these factors are: training expired, background check expired, background check failed, and training failed.

An admin can configure Access contributing factors and their corresponding points in a configuration page.

Importantly, the admin is to associate risk/sensitivity levels at either/or and combinations of System level (CIP Asset, PII DB, PHI DB, Credit Card DB etc.);
Roles (Accounts Payable, etc.);
Entitlements (Create New Business Account etc.); and
SOD's (Create Account & Pay Bill).

The expected risk/sensitivity levels are as above and Low, Medium, High and Critical with expected score impacts.

Examples of access factors are: SOD's and associated levels, Roles, Entitlements to physical, IT and operational systems that are deemed more sensitive and critical than others, such as CIP assets, credit card database tables, PII tables (personal identifiably information), PHI (personal health information), system tables, etc.

An admin can enter Usage contributing factors and their corresponding points in a configuration page.

Examples of usage factors are: SOD violation levels, repeated failed badge swipes, inactivity, etc. A list of triggering events can be referred to in the later part of this discussion. As well, usage factors can be related to/based on the risk associations defined hereinabove.

An admin can enter Ad Hoc contributing factors and their corresponding points in a configuration page.

It should be appreciated that an embodiment provides a separate requirement for a manual data entry screen for incidents/violations.

Risk Calculation—Rule Builder.

The Rule Builder in the configuration page is flexible in that the user can add values to the drop-down lists in the same interface. The Rule Builder in the configuration page is flexible in that the user can add a category of contributing factors.

As an admin/end-user with ownership to run it, the admin is enabled to click on a "Risk Distribution of Identity Population". This produces a graph or chart that shows the score distribution of all users. This can be a graph/plot of number of users v/s score, i.e. statistical ideal is a bell curve. One purpose is tell the admin whether the scores for the department is appropriate, it might be too high or too low. This is a visualization to enable the admin/end-user to see if there are too many users with high scores.

In the configuration page, the admin is able to click on a "Preview the Identity Population". This produces a graph or chart that shows the score distribution of all users. This should be a graph/plot of number of users v/s score, i.e. statistical ideal is a bell curve. One purpose is tell the admin whether the baseline scoring that he has assigned to HR attributes might be too high or too low. This is a simulation tool to give the admin visibility that the points allocated are realistic and to enable the admin to see if there are too many users with high scores.

Risk scores can be calculated at real-time, i.e. whenever an event happens that is considered a contributing factor. These events can include real-time and reconciliation or batch based events. The score can increment by those points. The identity view can reflect the change of score, as well as any view that shows the score of a person, e.g. dashboards, change of access.

When an admin changes the points allocated in the risk configuration page, there is a warning that indicates he needs to run a batch job that recalculates everybody's scores.

In an embodiment, the application can provide a batch job to recalculate the risk scores. The job can be filtered by department, by division, by location, but the default can be for all identities. This is used when the formula and risk points for contributing factors have changed. In an embodiment, the option for this job can be paged so that it can be run in chunks.

Application or Resource Risk.

In an embodiment, risk score are assigned to applications or resources based on factors such as number of orphans, dormant, shared or service accounts. This process can be referred to as Resource Risk Scoring and can be combined with the risk associated with the resource itself.

Audit.

An embodiment is configured for tracking of risk scores over time for trending analysis. An audit trail can keep track of what was incremented or decremented from the risk score, what event happened, and the date/time it happened. The event or contributing factor can be specific whether it was from a real-time change or from a reconciliation/background process.

An audit trail for the administrator who maintains the risk configuration page can be maintained. Useful information are: change that happened, who made the change, when the change was made.

Content Pack.

An embodiment includes a standard library of risk templates to speed configuration and deployment of a risk-based compliance methodology.

Ad Hoc Incident Entry Form.

In accordance with an embodiment, a solution can allow for the end-user, given the right permissions, to manually enter incidents, citations, violations. The following fields can be captured: date/time, person involved (search from identity master), incident description, criticality (high, medium, low). The ID of the person entering the record can be captured from the login. The task is workflow driven and can be forwarded to an approver, with notes and attachments capability. The event of creating this record can go into an audit trail. The event cannot show up in the History of the identity in the Identity View. Only certain administrators can view this data. These incidents can contribute to the risk score based on the configurations.

Ad Hoc Incident Report.

An embodiment is configured to generate a report of the ad hoc incidents, filtered by date ranges or the person who reported the incident.

Report Builder.

An embedment is configured to expose the Report Builder and an Identity Warehouse view so that consultants on premise and the customer cannot be dependent on engineering on creating specific reports.

Watch List.

In accordance with an embodiment, everyone on the watch list can automatically generate real-time alerts regardless of type of activity for sensitive/risky systems. It should be appreciated that the behavior or the risk score does not matter.

An admin/security-admin can configure the risk score that adds a person to the watch list. The person who owns the identity is not able to see that they are on the watch list or their score.

An admin/security-admin can check a checkbox in the Identity Profile that says "Add to Watch List". The person who owns the identity should not be able to see this checkbox.

Business Intelligence and Big Data Analysis.

An embodiment provides a solution that is able to interface with Big Data Analytics platform such as Hadoop, Autonomy and/or SAP Hana.

Behavior Pattern Capture.

In an embodiment, the solution is able to capture behavior patterns. For each person, the system captures all the events (time of badge in, lobby entry, time of badge out, etc.), the median of the time the event happens over a time range (time range is configurable), the standard deviation over the course of time range, and what it was same time last year. Only admins with the permissions are able to view these aggregated entries.

Abnormal Behavior Pattern Recognition.

An embodiment provides a solution that is able to identify anomalous behavior. This can be time-based or location-based departure from his normal behavior. The number of anomalous events that happens in a sequence that can trigger an alert can be configurable as an action rule. Part of the configuration can be the increment to the risk score.

If the person is attempting to access an asset, access point, or system that is considered critical, an alert is issued out right away if the customer chooses to. This is configured in an action rule which may or may not be activated. Part of the configuration is the increment to the risk score.

If the person is attempting to access an asset, access point, or system that he does not even have access to, an alert is issued out right away if the customer chooses to. This is configured in an action rule which may or may not be activated, along with the increment in the risk score, if any. This is based on the principle that a person should not even attempt to use his/her badge in an area that he is not allowed entry.

A lack of badge-in event is considered an anomaly and can be looked at as part of a sequence of abnormal events. An alert can be issued, which is configurable. The increment to the risk score is also configurable.

A new hire can be given an x-day probation period, whereby his events are recorded but are not alerted out as abnormal behavior. This is because he has no history recorded yet, and the solution may most likely trigger an alert. X should be configurable. This does not override other alerts, only for the behavior anomaly recognition.

If a person is rehired into the same position he/she can be given a probation period, wherein his/her events are not recorded but are not alerted out as abnormal behavior. This is because the end user's history may not be appropriate given the new role.

This does not override other alerts, only for the behavior anomaly recognition.

If a person is transferred into a different position, the system treats him as a new hire, i.e. he is given an x-day probation, where his events are recorded but are not alerted out as abnormal behavior. This does not override other alerts, only for the behavior anomaly recognition.

Asset Criticality Configuration.

In an embodiment, in the assets section a table and UI are provided such that criticality or sensitivity levels of assets/access points can be configured.

Configuration.

In an embodiment, a risk scoring/predictive analytics admin is able to configure in a screen the following: the number of days probation for new hire, the risk score increment for a new hire, the number of days for a person who just got transferred, time range for calculating the median, and standard deviation of the same event per person.

Predictive Analytics UI.

An embodiment provides a graphical representation of a person's behavior patterns that can be invoked using filters. Filters can be the events, the time range, etc. One can drill down into the data depending on the portion of the graph that is clicked. Raw data can be shown, as well as the identity profile of the person.

Display Risk in Certify Project.

In an embodiment, when the approver opens a certification process window such as a Certify project, he can see the risk score for each of the users.

Display Risk in Alert Action Alert.

An embodiment display the risk score of the person that produced the alert.

Figure 11:
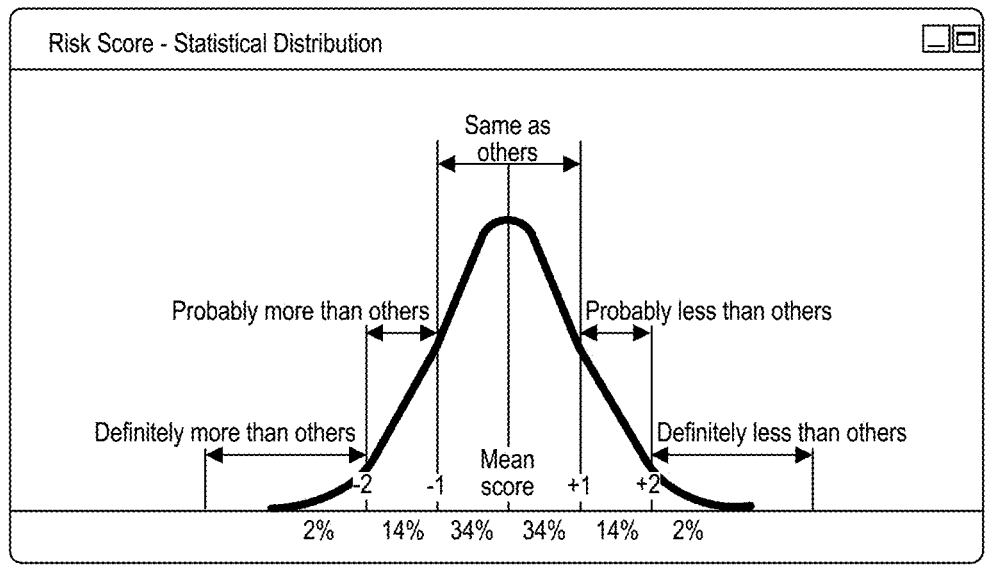
FIG. 11 is a graph of a statistical distribution of a risk score, according to an embodiment of the invention.
Figure 12:
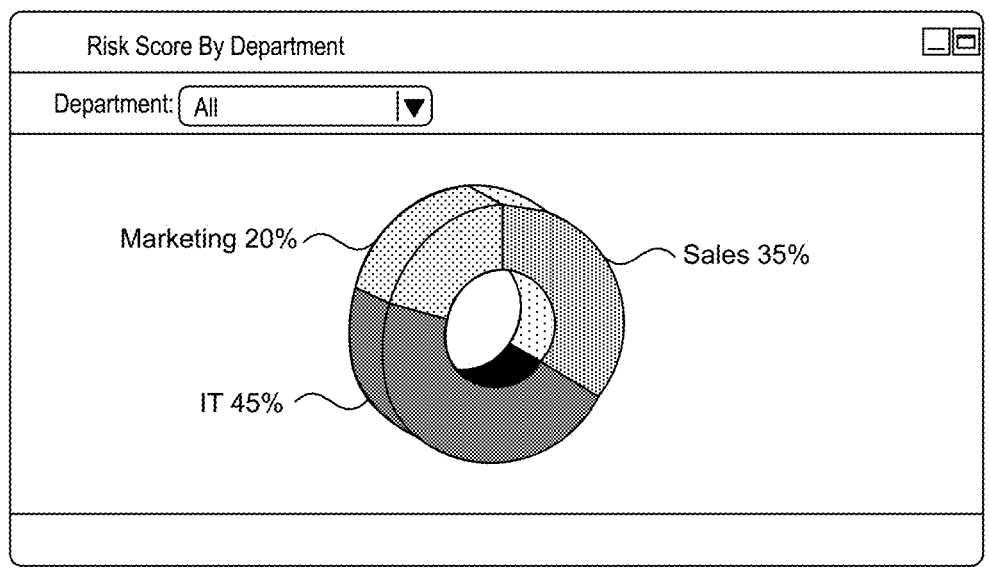
FIG. 12 is a colorized graph of a particular a departmental dashboard of risk score totals, according to an embodiment of the invention.
Figures 13, 14:
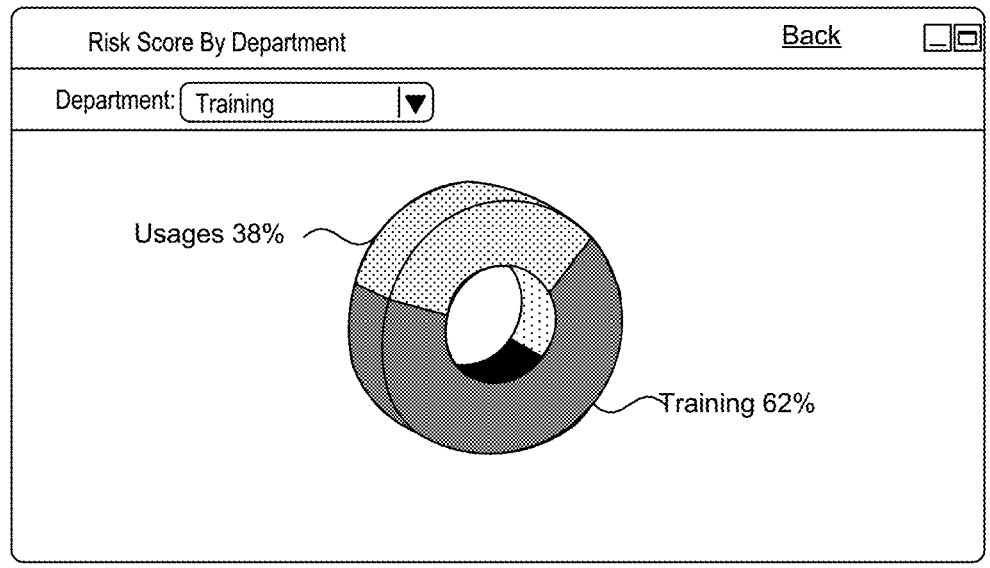
FIG. 13 is a colorized graph at drill down level 1, a view of risk distribution for the training department, according to an embodiment of the invention.
FIG. 14 is a table at drill down level 2 of identities who belong to the IT department, according to an embodiment of the invention.
Figure 16:
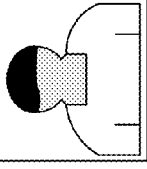
FIG. 16 is a view of events that contributed to the score at drill down level 4, according to an embodiment of the invention.
Figure 18:
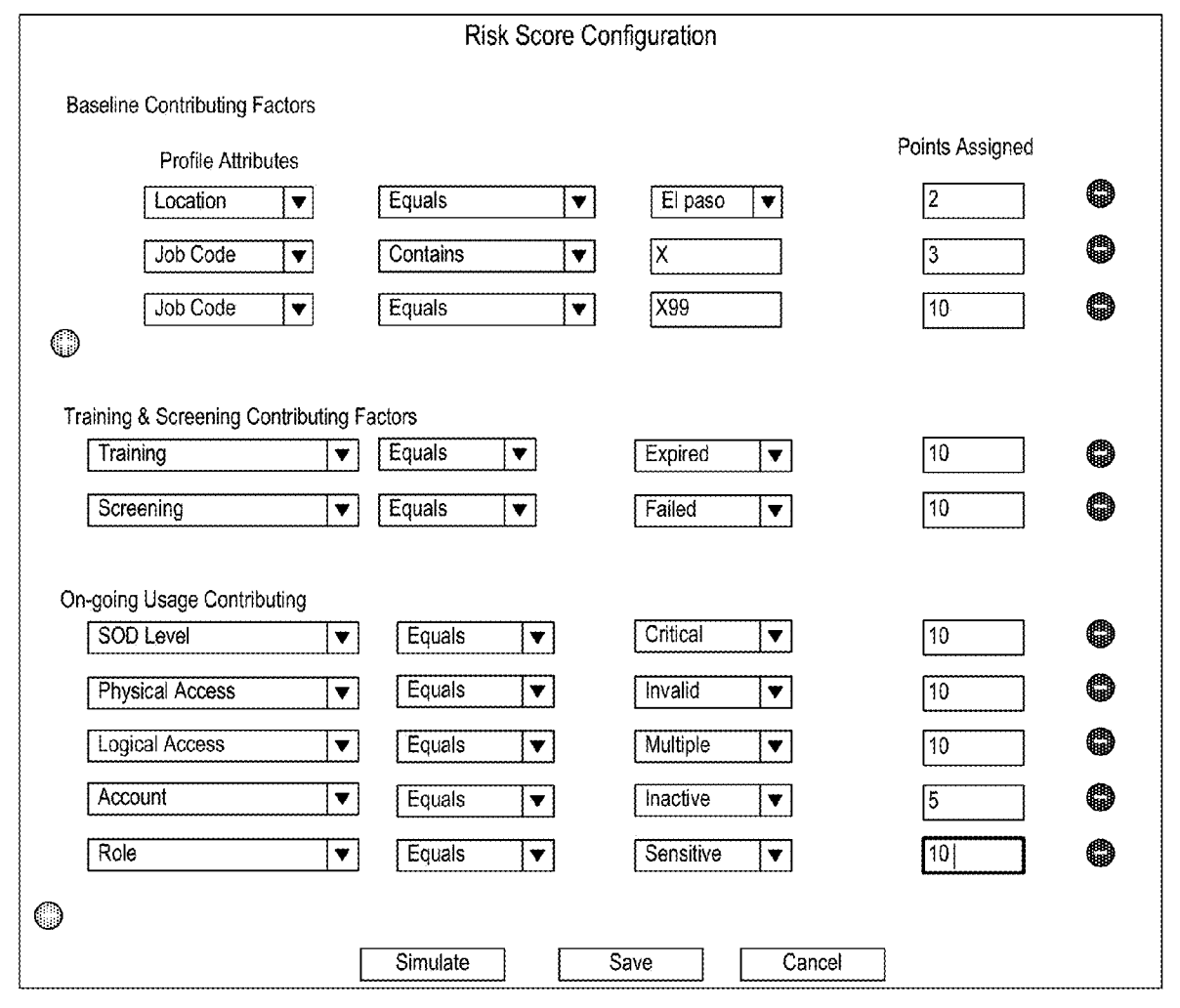
Figure 19:
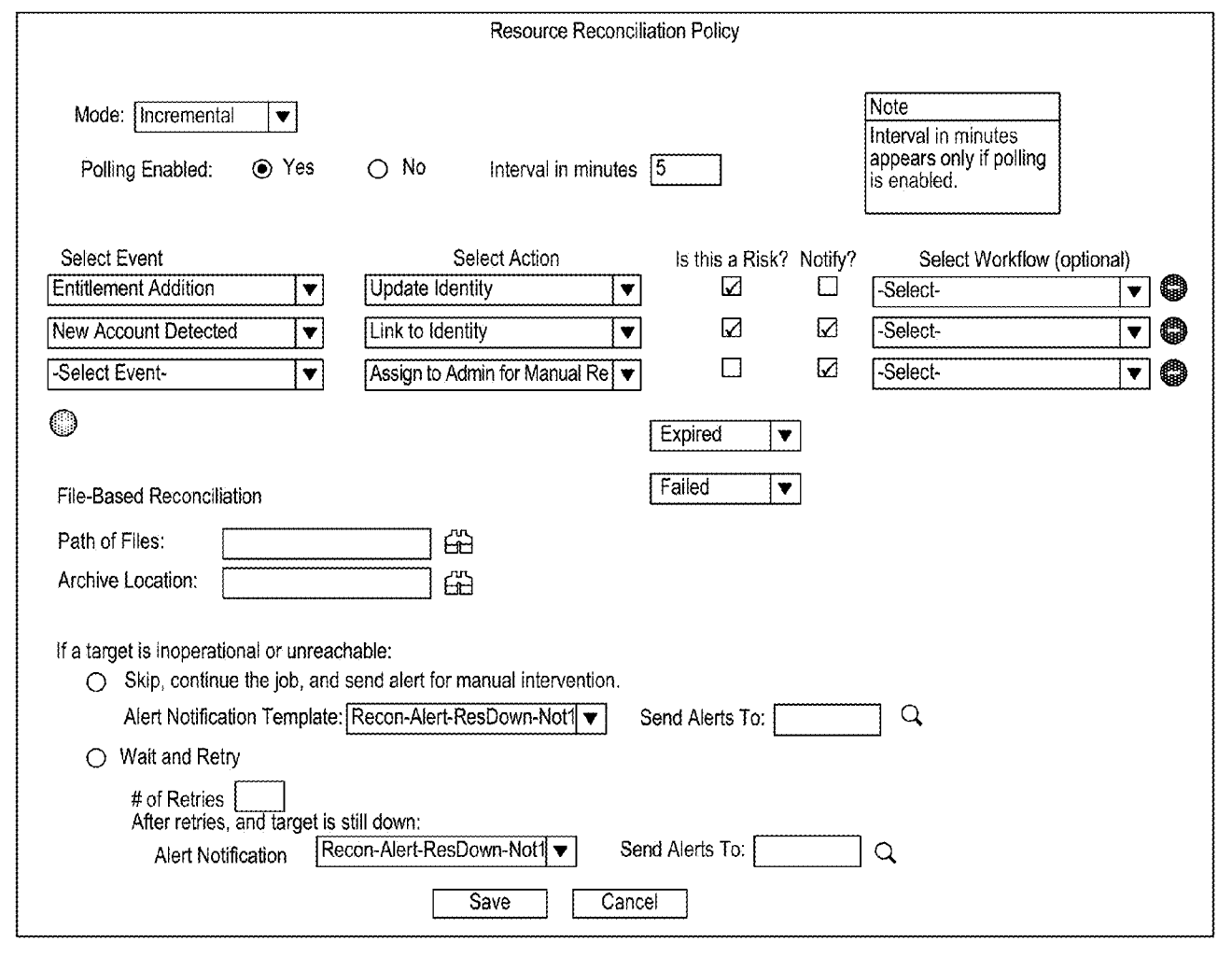

One or more embodiments of the invention can be described with reference to FIGS. 11-19. FIG. 11 is a graph of a statistical distribution of a risk score. FIG. 12 is a colorized graph of a particular departmental dashboard of risk score totals. FIG. 13 is a colorized graph at drill down level 1, a view of risk distribution for the training department. FIG. 14 is a table at drill down level 2 of identities who belong to the IT department. FIG. 15 is an identity view with the risk score at drill down level 3. FIG. 16 is a view of events that contributed to the score at drill down level 4. FIG. 17 is a schematic diagram showing mock-ups of comparative dashboards by department. FIG. 18 is a mock-up configuration screen of various input factors. In an embodiment, the rule builder is more flexible than as described herein. FIG. 19 is a mockup of resource reconciliation policy page where an event trigger can be configured as a risk. In an embodiment, a score increment can be assigned/decided on these event triggers.

Exemplary Use Cases and Reference Implementation with Risk Score Impact

Below is a table, namely, Table A, that outlines the risk score impacts based on the identity behavior, in accordance with an embodiment. In the embodiment, a risk score baseline is established upon on-boarding of the identity. the baseline is assigned based on the risk profile. The identity starts off with a perfect score, and starts incrementing as contributing factors in his risk profile are assigned, such as location or department. The score continues to get higher as access to high risk systems or roles are assigned. the score gets recomputed regularly as usage data in the identity store gets populated, such as violations. The higher the score, the higher the risk. It should be appreciated that the risk score may be a positive or negative number.

TABLE A

| USE CASE | RISK SCORE |
| --- | --- |
| Risk Score Baseline | Start with zero, incrementing based on per attribute assigned score |
| Access to a high risk area | +10 |
| Security personnel can bypass the regular security checkpoint (Applies to Security Personnel or Airport staff) | +10 |
| Background CHRC, PRA, No-Fly Check (if applicable) Do Not Admit List Check Access Levels for Airport | +10 if Poor |
| SIDA | SIDA (+10) |
| Sterile | Sterile (+5) |
| AOA | AOA (+10) |
| Secured | Secured (+5) |
| Public | Public (+3) |
| Access contains | |
| Critical SOD | Critical SOD(+10) |
| PII/Critical CIP/Sensitive System | PII/Critical CIP/Sensitive System (+10) |
| Sensitive Task without mitigation | Sensitive Task without mitigation (+5) |
| Sensitive Task with Mitigation | Sensitive Task with Mitigation (+3) |
| Pattern of individual typical working hours from 9 am-5 pm. Then unusual badge usage at 2 am on a given day. | 5 |

More Exemplary Use Cases
  Pattern of individual typical working hours from 9 am-5 pm. Then unusual badge usage at 2 am on a given day.
  Pattern of individual changing typical work hours after an annual or semi-annual HR review period.
  Pattern of typical working hours from 9 am-5 pm. Then unusual badge usage at 2 am on a given day when the individual has less than 30 days on the job (employee/contractor expiration date is within 30 days.)
  Pattern of using badge multiple times within a short period, such as 20 min. This can be due to suspicious activity.
  Pattern of two people using their badges at the same location(s) at the same time. One has access and other does not (two-man rule).
  Pattern of individual tailgating to access a location he/she does not have access. This can be tracked with camera setup to scan a particular activity or when door is held open too long. May require video analytics integration.
  Pattern of individual not accessing the network for X number of days. This can be that the individual is on vacation, no longer with the company or using another identities login credentials.
  Pattern of individual not accessing the facility for X number of days. This can be that the individual is on vacation, no longer with the company, reported a lost/stolen badge or using another identity's lost/stolen badge.
  Pattern of frequent access to a Sharepoint/document management location and downloading documents. This can mean that are stealing proprietary or trade secret information.
  Logged into VPN and present in the building.
  Pattern of accessing the same facility, then the individual attempts or accesses another facility. The person could have access or be using a lost/stolen badge.
  Tailgating case? Perhaps the person did not badge to get into the building, but badged into the datacenter.
  Individual did not badge to get into the building, but logged into the network.
  Person opens the door and leaves the door open.
  Force door open with no badge.

Exemplary Reports and Dashboards

An embodiment is configured to provide a wide variety of reports and dashboards, including but not limited to the following.
  User Profile Report. Report listing badge usage over a period of time by user. Filter by location, user or time period.
  Badge Access Anomaly Report. Displays the profile anomalies of unusual activity, such as but not limited to a badge usage after hours. Filter by location, user or time period.
  User Frequency Report. Displays pattern of using badge multiple times within a short period, such as 20 min. This could be due to suspicious activity. Filter by user or location.
  Potential Tailgating Report. Displays common activity of a profile tailgating another user into a location. Filter by location. It should be appreciated that this can require a configuration based on door held open too long and video analytics.
  User Outlier Report. Displays the average times, e.g. standard deviation, a location is accessed, the badge usage for a particular and how often the location is accessed exceeding the average/deviation.
  Team Outlier Report. Displays the average times, e.g. standard deviation, a location is accessed and the badge usage for each profile (user 1 and user 2) and how often the location is accessed exceeding the average/deviation.
  Badge Access Pattern Profile Dashboard. Dashboard providing badge access time patterns over a period of time. This dashboard can be a line graph that displays spikes based on profile badge behavior. Filter by user.

Exemplary External Interface/Integration Requirements

One or more embodiments can be configured to but is not limited to being configured to:
  Interface with various HR systems to provide intelligence reporting over occurred event;
  Interface with a business intelligence tool;
  Interface with various physical systems to provide usage and monitoring information;
  Interface with various logical systems to provide usage and monitoring information; and
  Interface with various operational systems to provide usage and monitoring.

Exemplary Use Case and Dashboard, Source Type, and Events

In an embodiment, the following risk parameters used for the algorithms for risk scoring include but are not limited to including:
  Role;
  Periodicity;
  Physical Access Level Risk;

Logical Entitlements;
Sensors; and
IT Risk (Scoring: C=Confidentiality, I=Integrity, A=Availability).

In an embodiment, source events include but are not limited to those in Table B.

TABLE B

| Source Type | Event |
| --- | --- |
| Access Point | BadgeIn |
| Access Point | BadgeOut |
| Alarm | ForcedOpen |
| Alarm | HeldOpen |
| Application | TransactionExecution |
| Sensor | SensorDataRead |
| Application | ApplicationException |
| Alerting System | NotificationReceived |
| Access Point | HeldOpen |
| Access Point | ForcedOpen |
| Access Point | DuressAlarmActive |
| Badge | NoBadgeIn |
| Badge | NoAccessTransaction |
| Alarm | PullStationAlarmActive |
| Alarm | MonitorPointinAlarm |
| Access Point | MonitorPointinAlarm |
| SCADA System | NewValue |
| SCADA System | NewConnection |

In an embodiment, events include but are not limited to those in Table C.

TABLE C

| Event Name | Description |
| --- | --- |
| BadgeIn | Badge In |
| BadgeOut | Badge Out |
| ForcedOpen | Door opened without a badge swipe |
| HeldOpen | Held Open |
| SensorDataRead | Sensor Data Read |
| TransactionExecution | Transaction Execution |
| ApplicationException | Application Exception |
| Notification Received | Notification Received |
| AlarmGenerated | Alarm Generated |
| AlarmChanged | Alarm Settings Changed |
| DuressAlarmActive | Duress Alarm/Panic Alarm active |
| PullStationAlarmActive | Pull Station Alarm Active |
| NoBadgeIn | No Badge In |
| NoAccessTransaction | No Access Transaction |
| MonitorPointinAlarm | Monitor Point in Alarm |
| NewValue | New Value |
| Login | Login |
| SetPointChanged | Set Point Changed |
| ConfigurationChanged | Configuration Changed |
| NewMessage | New Message |
| NewConnection | New Connection |
| Status | Status |

It should be appreciated that persons of ordinary skill in the art will understand that apparatus and methods in accordance with this invention may be practiced without such specific details as those described hereinabove.

An Exemplary Risk Scoring Job Sequence

Figure 20A:
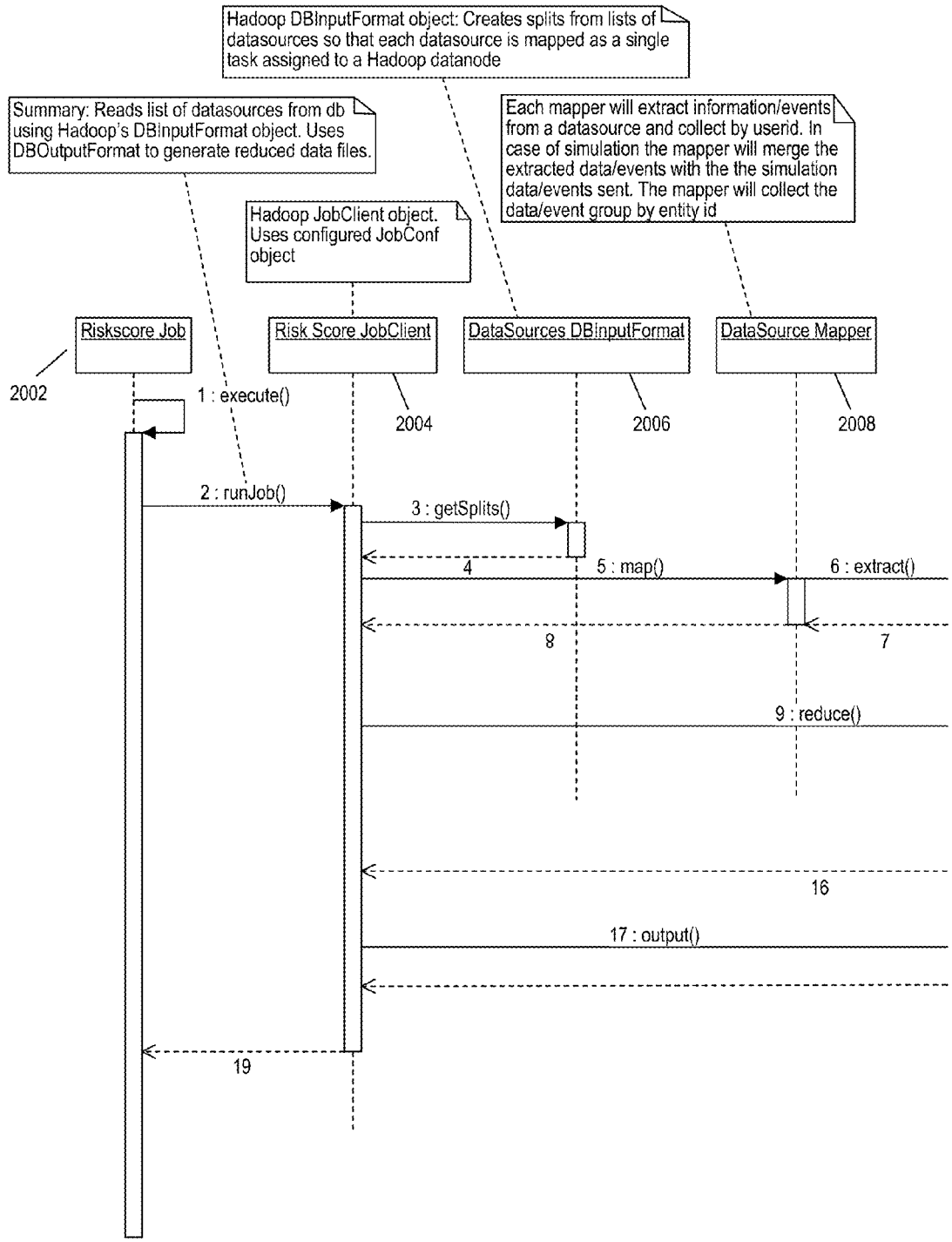
FIG. 20A-20B is a risk scoring job sequence diagram, according to an embodiment of the invention.
Figure 20B:
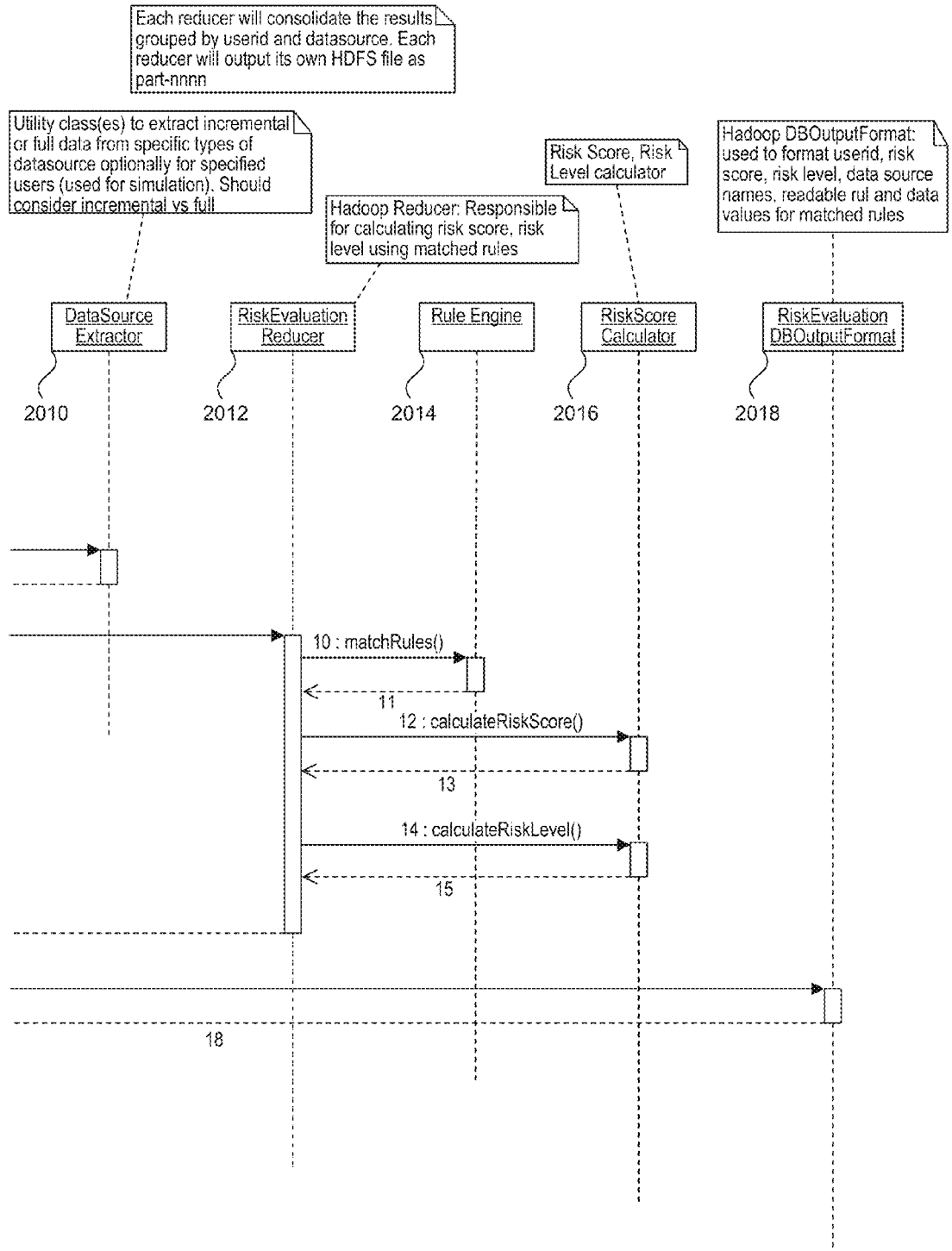

An exemplary risk scoring job sequence can be understood with reference to FIG. 20A-20B. At step 1, a risk score job is executed at an engine, Riskscore Job 2002. At step 2, a job is run which reads lists of datasources from a database using Hadoop's DBInputFormat object. The job uses DBOutputFormat to generate the reduced data files. At risk score JobClient 2004, the Hadoop JobClient object, uses the configured JobConf object. At step 3, the Hadoop DBInputFormat object creates splits from the list of datasources so that each datasource is mapped as a single task assigned to a Hadoop datanode, as performed by DataSources DBInputFormat 2006. At step 4, each mapper extracts information/events from a datasource and collects by userid. In case of simulation the mapper merges the extracted data/events with the simulation data/events sent. The mapper collects the data/event by entity id. These operation are performed by DataSource Mapper 2008. At step 5, DataSourcesDBInputFormat 2006 performs the map operation. At step 6, DataSource Extractor 2010 performs an extractor operation. Utility class(es) extract incremental or full data from specific types of datasource optionally for specified users (used for simulation). At step 7, DataSource Extractor 2010 sends data back to DataSource Mapper 2008. At step 8, DataSource Mapper 2008 sends data back to Risk Score JobClient 2004. At step 9, the reduce operation is called by RuleEvaluation Reducer 2012, which is a Hadoop Reducer that is responsible for calculating risk score or the risk level using matched rules. At step 10, Rule Engine 2014 calls a match rule operation and returns the results to RuleEvaluation Reducer 2012 at step 11. At step 12, RiskScore Calculator calculates the risk score and returns the results to RuleEvaluation Reducer 2012 at step 13. At step 14, RiskScore Calculator 2016 calculates the risk level and returns the results to RuleEvaluation Reducer 2012 at step 15. At step 16, RuleEvaluation Reducer 2012 sends data to Risk Score JobClient 2004. At step 17, Risk Score JobClient 2004 invokes RiskEvaluation DBOutputFormat 2018, where the Hadoop DBOutputFormat is used to format userid, risk score, risk level, data source names, and readable rule and data values for matched rules. The results are sent to Risk Score JobClient 2004 at step 18. At step 19, Risk Score JobClient 2004 sends results back to Riskscore Job 2002.

Exemplary High Level and Technical Designs for Risk Score Calculation, Risk Score Data and Event Extraction from Data Sources, and Risk Score and Risk Level Calculation An embodiment includes but is not limited to the following high level and technical designs for Risk Score Calculation, Risk Score Data and Event Extraction from Data sources, and Risk Score and Risk Level Calculation. It should be appreciated that the details are exemplary only, i.e. for purposes of understanding, and are not meant to be limiting. One skilled in the art would readily recognize substitutions, additions, and omissions that are possible and that are within the scope of the herein described invention.

Risk Score Calculation.
High Level Design
1) Create a new Quartz Job implementing IInterruptableJob and IParameterizedJob called:
"Risk Score Job".
2) Parameters for the Job:
Run Job for Entity Type: Dropdown of supported entity types: 'Identity', 'Assets'. Should include an additional entry in the dropdown labeled "All Entity Types"—this is the default value of the dropdown.
Match Attribute: Dropdown of selected entity type's available attributes. Can include an additional entry in the dropdown labeled "No attribute—match condition"—as the default value of the dropdown
Match Value: A text box to enter attribute value
Score Calculation: A dropdown with values "Full" (default value for this dropdown), "Incremental".

It should be appreciated that the above parameters allow the user to customize the job by specific entity type vs for all entities, do not condition vs condition on an attribute, i.e. value match, and finally, full (re)calculation vs incremental calculation.

3) Risk Score Job's execute( ) method: It should be appreciated that the job parameters are passed on to both the mappers and reducers via the Hadoop's Job-Conf object. Additional parameters can also be passed in case of simulation (see point 5 below).

4) When invoking the hadoop job, a list of data sources are used as an input file which is "split" using either DBInputFormat or other text based Input Format objects. Each invocation of the mapper expects a key/value pair with data source information.

5) Simulation: This Quartz Job implementation class can also be used for the purpose of simulation. The simulate( ) method can expect Entity Type, list of entities, list of Data sources and their corresponding data/events in the format extracted from data sources, e.g. conversion to uniform format can be performed in the mapper. The parameters received for the purpose of simulation can be passed on to the mapper and reducer as is.

Technical Design

1) Create a new pojo called HadoopJobStatus in ALNT-Fabric which can get persisted to db, i.e it needs a hbm file. Other fields can be 'type' of hadoop job (for risk score calculation: 'scheduled' job execution or 'simulation' or 'adhoc'), date/time started, date/time ended. These parameters can be expanded as needed. This class can be used later for tracking other types of hadoop jobs as well.

2) Before hadoop is invoked to calculate risk score (for either scheduled job execution or simulation or adhoc), create a new instance of HadoopJobStatus and save it in the database first. The generated id can be used as the <hadoop job status id>.

3) The <hadoop job status id> from above is used as root for input/output directories in both HDFS and local files system.

4) The quartz job queries for data sources from db (using existing services/dao) and generates the data sources list file in local file system. The format of generated file is <key>\t<value>, i.e tab separated key value pairs. The key is the data source name and the value is xml string such as below:

```
<riskscore-input>
    <datasource-type>Incident</datasource-type>
    <!--will expand as needed-->
</riskscore-input>.
```

It should be appreciated that the data sources list can potentially be big based on customer's environment and configured rules.

5) The quartz job specifies <hadoop job status id>+"/input" as hdfs directory for "put" as well as input directory for "jar" commands.

6) The quartz job specifies <hadoop job status id>+"/output" as the output path for the "jar" command. The output file can potentially be large based on number of entities (such as users) that end up in risk score calculation.

7) The quartz job is responsible for using "get" to read hadoop's output into local file system and process as needed. The output file can be of format: <key>\t<value>, i.e tab separated key value pairs. The key is the entity id (such as user id) and the value is xml string with format such as below:

```
<riskscore-output>
    <entity-id>1234</entity-id> <!-- repeating the key here ... easier to parse later -->
    <riskscore>550</riskscore>
    <rule-match>
        <rule-desc>user friendly rule name for displaypurpose</rule-desc>
        <data-match>
            <attr-match>
                <attr-name>attr name</attr-name>
                <attr-value>attr value</attr-value>
            <attr-match>
            <!-- repeat attr-match as needed>
        </data-match>
    </rule-match>
    <!-- repeat rule match as needed -->
</riskscore-output>
```

8) The quartz job processes the hdfs output as follows for each entity in the output file. It is important to commit data related to one entity at a time to avoid long holding of locks on the effected tables, i.e keep the db transactions short to avoid UI 'clocking'.

9) For scheduled job execution and adhoc call: clean all the previous risk score output records for the entity id and then insert all the data from xml format to db tables. It is contemplated that the db tables are designed to store risk score output.

10) For simulation call return only the entity id and risk score as a hashmap and disregard other information to ensure memory usage is only as needed.

Risk Score Data and Event Extraction from Data Sources.

High Level Design

Hadoop Mapper: This implementation of hadoop mapper expects the job parameters in the configure( ) method's JobConf parameter and conditions the processing based on the parameters in JobConf object.

1) The implementation of map( ) method expects a key/value representing the datasource for which the extraction is being currently done. The mapper extracts data/events only for the data source received in the key/value. The mapper uses data source specific utility classes for data/event extraction.

2) Irrespective of the data source, the extracted data/event is converted to a uniform data format for later processing step by reducer.

3) The mapper collects the extracted data/events into the output collector using the entity type and entity id encoded as the key.

4) Simulation support: This is the mapper needed to support simulation. For the purpose of simulation, the Job-Conf object available in configure( ) method can be used to receive additional entity type, entity id, data sources and the data/events that are to be converted to uniform data format and collected by output collector grouped by entity type and entity id encoded as key.

5) The reducer can thus use the information to reduce and calculate risk score and risk level.

Technical Design

Create an interface IDataSource, with at least one method "extract". The classes implementing this interface are responsible for extracting data from the data source passed as parameter in the extract method. This is used by mappers.

Create a factory class called DataSourceFactory, which is responsible for creating an instance of data source implementing IDataSource interface based on the type of data source (one IDataSource implementation is available for each supported data source type). Register it as a bean in spring context Create a mapper called DataSourceMapper, which is responsible for using DataSourceFactory to create an instance of IDataSource and starts the extraction process.

Risk Score and Risk Level Calculation.

High Level Design

1) Rule Evaluation Reducer: This implementation of hadoop reducer expects entity type and entity id encoded as the key and the data/events from various data sources for that entity as values. The reducer invokes Rule Engine for any rule matches. It invokes the Risk score calculator to determine the risk score and risk level based on matched rules.

2) The output of the reducer is entity type, entity id, risk score, risk level, string representation of rule, e.g. in case rule changes after calculation, data values, e.g. to be able to inspect the values which resulted in the rule match in case data changes after calculation.

3) The output can be saved to db using DBOutputFormat object or a custom output format object that works well with existing fabric infrastructure.

Technical Design

1) Create an interface IRiskScoreService, with at least one method "calculate". The class implementing this interface is responsible for calculating risk score for each user in the list of users and the corresponding data/events.

2) Create an implementation class RiskScoreService implementing IRiskScoreService. Register it with spring context 3) Create a reducer called RiskScoreReducer, which is responsible for using IRiskScoreService and invokes the calculate method. This will be used to reduce for list users and return calculated risk score for each user.

An Exemplary Risk Score and Risk Level Algorithm

In an embodiment, a risk score of an entity such as user is the total sum of all the scores contributed by the matching rules. Thus, if an entity matches 5 rules and each rule contributes 25 points, then the risk score of the entity is 125. It should be appreciated that unless restricted at configuration time, the risk scores can potentially be large numbers when the rule contribution scores are large. In an embodiment, it is recommended that the possible rule score contributions are restricted to a range of values, such as for example 0 to 100, to avoid variable value overflows in case of many rule matches and to avoid overly skewed data, i.e. some rules have tiny scores and some have extremely large scores.

In an embodiment, the risk level of an entity is a mapping of the risk score to a value between 0 and 100. To determine the risk level of an entity, following are two approaches in accordance with one or more embodiments herein:

Risk level is percentile (or similar) score of all the calculated risk scores of all the entities. The algorithm involves first calculating risk scores of all the entities and then determines the percentile of each entity with respect to other entities. Other statistical methods such as z-scores (which use 'mean' and up to 6 'standard deviations' to include around 95% of scores) can be employed as well. One possible issue can be that there may be entities that have their percentile (or similar) score) in 80's and 90's irrespective of however small their total risk score is, and thus their risk level can always be "high" for such entities.

Risk levels can be calculated as percentage of total of all rule scores. An issue with this approach alone may be that the actual risk score for matched rules for an entity may be too skewed towards the lower spectrum of possible score range. For example, when sum total of all rule score contributions is 1000 from 100 rule score contributions and when the entity matches 5 critical rules for a total of whopping 200 risk score, the risk level can still be 20, which may not reflect the true risk level.

To avoid the above issues, embodiments can include the following approaches for determining risk levels:

Create entity groups to group related rules together. The entity groups can help localize the importance of each rule within their group and can later help the matched rules contribute to the overall risk level of the entity in a more reasonable way. For example, the details in the following points may apply.

It is assumed that the entity groups are created in such a way that the entities satisfy rules as much as possible from a single group. On the other hand the entity group needs to be compact enough so as to maximize its relevance in the overall risk level determination, e.g. the details in following points.

It is possible that a rule can be assigned multiple distinct entity groups, i.e. a rule can be present in more than one group.

Algorithm: The risk level for any entity involves two parts. The first part uses configuration performed by an administrator to a determine maximum (max) risk score that can used as the 100. This calculation can be performed once before calculating the risk level for the selected entities. The second part uses the matched rules for an entity to determine the risk score per configured group and the max group score is used to determine the risk level as follows:

Using Configuration: Using the risk scores specified in the rules configuration, determine the Risk Level—100:

Calculate the group score for a group $G_i$, as follows $$G_i = \sum_{j=1}^{n} r_j,$$

where $r_j$, is risk score of rule $R_j$ in group $G_i$,

Determine the Risk Level—100, $\sigma_{100}$ as follows $$\sigma_{100} = \max_{i=1}^{N} G_i,$$

where N is total number of entity groups

Using Entity Risk Scores: Using the risk scores obtained from the matched rules for an entity, determine the Risk Level of the entity as follows:

Calculate the entity group score $G_{ei}$ as follows $$G_{ei} = \sum_{k=1}^{n} r_k,$$

where $r_k$ is the risk score of matched rule $R_k$ in group $G_{ei}$, for entity e Determine the max Risk Level for entity e, $\sigma_{e_{max}}$ as follows $$\sigma_{e_{max}} = \max_{i=1}^{N} G_{ei},$$

where N is total number of entity groups

Calculate the scaled entity risk level $\sigma_e$, as follows:

$$\sigma_e = (\sigma_{e_{max}} / \sigma_{100}) * 100, \text{ rounding to nearest integer.}$$

AN EXEMPLARY RISK SCORE DATA SOURCE IMPLEMENTATION

An exemplary risk score data source implementation is provided in accordance with an embodiment. Following are nine definitions of particular objects in an embodiment. It should be appreciated that these details are illustrative only and are not meant to be limiting. One skilled in the art could readily make substitutions, additions, or omissions of the particular details and still be within the scope of the invention.

1. Implement Risk Score Data Source—Identity (User Details)

Retrieve the details from Identity User Detail table (IDMUserDetails—AAXT$_{13}$ IDMUSER_DETAILS. Create a map object and store attribute name as key and for the value store attribute value. See Table D.

TABLE D

| Attributes | Value |
|---|---|
| dataSourceName | Set the dataSourceName from the input of RiskScoreDataSource Object |
| dataSourceType | Set the dataSourceType from the input of RiskScoreDataSource Object |
| entityType | RiskScoreConstants.ENTITY_TYPE_IDENTITY |
| entityId | User Id |
| inputEventClassName | |
| inputEvents | List of RiskScoreCEPAttrEvent Multiple object of RiskScoreCEPAttrEvent based on of Identity Set jobId: from input of JobId Set userId: COLUMN1 of IDMUserDetails Set attributeValues (Map Object): add all the attributes of the user from IDMUserDetails with key and value to the attributeValues (To get the attribute name, use the UserFieldMappingDetails - AAXM_USR_FLD_MAP and to attribute value from IDMUserDetails COLUMN<COL_LOC>. COL_LOC is AAXM_USR_FLD_MAP.) |

2. Implement Risk Data Source—Incident Reporting (Manual)

Retrieve the details from Incident Report Tables (AAAT_INCIDENT_REPORT, AAAT_INCIDENT_REPORT_USER) and return the details in an object RiskScoreDataSourceData as below, in Table E:

TABLE E

| Attributes | Value |
|---|---|
| dataSourceName | Set the dataSourceName from the input of RiskScoreDataSource Object |
| dataSourceType | Set the dataSourceType from the input of RiskScoreDataSource Object |
| entityType | RiskScoreConstants.ENTITY_TYPE_IDENTITY |
| entityId | User Id |
| inputEventClassName | |
| inputEvents | List of RiskScoreCEPMnlIncdtEvent Multiple object of RiskScoreCEPMnlIncdtEvent based on number of person involved in one incident Set jobId: from input of JobId Set userId: Person involved from Incident Report |

TABLE E-continued

| Attributes | Value |
|---|---|
| | Set severity: Severity from Incident Report Set eventDate: Incident Date from Incident Report |

3. Implement Risk Score Data Source—Incident Reporting (Auto)

Retrieve the details from Cases (Cases—AAAT_RAS_CASE, Case Attribute—AAAT_RAS_CASE_ATTR) and return the details in an object RiskScoreDataSourceData as below in Table F:

TABLE F

| Attributes | Value |
|---|---|
| dataSourceName | Set the dataSourceName from the input of RiskScoreDataSource Object |
| dataSourceType | Set the dataSourceType from the input of RiskScoreDataSource Object |
| entityType | RiskScoreConstants.ENTITY_TYPE_IDENTITY |
| entityId | User Id |
| inputEventClassName | |
| inputEvents | List of RiskScoreCEPAutoIncdtEvent Multiple object of RiskScoreCEPAutoIncdtEvent based on number of Alert Generated for person involved Get all the cases based on action work flow type. Set jobId: from input of JobId Set userId: attributeValue from CaseAttribute table where attributeName is UserId Set eventDate: Created date from case table Set ruleId: id from ActionRuleConfig table Set ruleName: ruleId from ActionRuleConfig table |

4. Implement Risk Score Data Source—Activity

Retrieve the details from Cases (Risk Score Cases—ARST_CASE, Risk Score Case Attribute—ARST_CASE_ATTR) and return the details in an object RiskScoreDataSourceData as below in Table G:

TABLE G

| Attributes | Value |
|---|---|
| dataSourceName | Set the dataSourceName from the input of RiskScoreDataSource Object |
| dataSourceType | Set the dataSourceType from the input of RiskScoreDataSource Object |
| entityType | RiskScoreConstants.ENTITY_TYPE_IDENTITY |
| entityId | User Id |
| inputEventClassName | |
| inputEvents | List of RiskScoreCEPActivityEvent Multiple object of RiskScoreCEPActivityEvent based on number of Risk Socre Case generated for person involved Set jobId: from input of JobId Set userId: attributeValue from RiskScoreCaseAttribute table where attributeName is UserId Set severity: Severity from RiskScoreCase table Set eventDate: Created date from RiskScoreCase table |

TABLE G-continued

| Attributes | Value |
| --- | --- |
| | Set ruleId: id from ActionRuleConfig table |
| | Set ruleName: ruleId from ActionRuleConfig table |

5. Implement Risk Score Data Source—Resources

Retrieve the details UserMasterSystems AFBC_USER_MASTER_SYSTEMS and SysConnectorLight AFBCSYS_CONNECTORS. Return the details in an object RiskScoreDataSourceData as below in Table H:

TABLE H

| Attributes | Value |
| --- | --- |
| dataSourceName | Set the dataSourceName from the input of RiskScoreDataSource Object |
| dataSourceType | Set the dataSourceType from the input of RiskScoreDataSource Object |
| entityType | RiskScoreConstants.ENTITY_TYPE_IDENTITY |
| entityId | User Id |
| inputEventClassName | |
| inputEvents | List of RiskScoreCEPResourceEvent Multiple object of RiskScoreCEPResourceEvent based on number of users Set jobId: from input of JobId Set userId: systemUserId from UserMasterSystems Set resourceId: perSystemId from UserMasterSystems Set resourceName: name from SysConnectorLight Set eventDate: lastModifiedDate from UserMasterSystems |

6. Implement Risk Score Data Source—Resources Roles

Retrieve the details UserRoles—AFBC_USER_ROLES and SysConnectorLight—AFBCSYS_CONNECTORS. Return the details in an object RiskScoreDataSourceData as below in Table I:

TABLE I

| Attributes | Value |
| --- | --- |
| dataSourceName | Set the dataSourceName from the input of RiskScoreDataSource Object |
| dataSourceType | Set the dataSourceType from the input of RiskScoreDataSource Object |
| entityType | RiskScoreConstants.ENTITY_TYPE_IDENTITY |
| entityId | User Id |
| inputEventClassName | |
| inputEvents | List of RiskScoreCEPResRoleEvent Multiple object of RiskScoreCEPResRoleEvent based on number of users Set jobId: from input of JobId Set userId: userId from UserRoles Set resourceRoleName: objName from UserRoles Set resourceId: perSystemId from UserRoles Set resourceName: name from SysConnectorLight Set eventDate: lastModifiedDate from UserRoles |

7. Implement Risk Score Data Source—Enterprise Roles

Retrieve the details UserEntRoles—AFBC_USER_ENTROLES. Return the details in an object RiskScoreDataSourceData as below in Table J:

TABLE J

| Attributes | Value |
| --- | --- |
| dataSourceName | Set the dataSourceName from the input of RiskScoreDataSource Object |
| dataSourceType | Set the dataSourceType from the input of RiskScoreDataSource Object |
| entityType | RiskScoreConstants.ENTITY_TYPE_IDENTITY |
| entityId | User Id |
| inputEventClassName | |
| inputEvents | List of RiskScoreCEPEntRoleEvt Multiple object of RiskScoreCEPEntRoleEvt based on number of users Set jobId: from input of JobId Set userId: userId from UserEntRoles Set enterpriseRoleName: objName from UserEntRoles Set eventDate: lastModifiedDate from UserEntRoles |

8. Implement Risk Score Data Source—Training

Retrieve the details UserTrainingDetails—AFBCLMS_COURSE. Return the details in an object RiskScoreDataSourceData as below in Table K:

TABLE K

| Attributes | Value |
| --- | --- |
| dataSourceName | Set the dataSourceName from the input of RiskScoreDataSource Object |
| dataSourceType | Set the dataSourceType from the input of RiskScoreDataSource Object |
| entityType | RiskScoreConstants.ENTITY_TYPE_IDENTITY |
| entityId | User Id |
| inputEventClassName | |
| inputEvents | List of RiskScoreCEPTrainingEvent Multiple object of RiskScoreCEPTrainingEvent based on number of users in the training table Set jobId: from input of JobId Set userId: userId from UserTraining Details Set enterpriseRoleName: courseName from UserTraining Details Set startDate: startDate from UserTraining Details Set end Date: end Date from UserTraining Details |

9. Implement Risk Score Data Source—Mitigation Control

Retrieve the details RnIMitigationUser—ARIT_MITUSER and RnIRiskMitigationControl—ARIT_MITCTRL. Return the details in an object RiskScoreDataSourceData as below in Table L:

TABLE L

| Attributes | Value |
| --- | --- |
| dataSourceName | Set the dataSourceName from the input of RiskScoreDataSource Object |
| dataSourceType | Set the dataSourceType from the input of RiskScoreDataSource Object |
| entityType | RiskScoreConstants.ENTITY_TYPE_IDENTITY |

TABLE L-continued

| Attributes | Value |
|---|---|
| entityId | User Id |
| inputEventClassName | |
| inputEvents | List of RiskScoreCEPMitCtrlEvent Multiple object of RiskScoreCEPMitCtrlEvent based on number of users in the Mitigation Control table Set jobId: from input of JobId Set userId: userId from RnlMitigationUser Set rskMitCtlId: rskMitCtlId from RnlRiskMitigationControl Set mitigationControlId: riskMitCtrl from RnlMitigationUser Set validFrom: startDate from RnlMitigationUser Set validTo: end Date from RnlMitigationUser |

An Example Machine Overview

Figure 21:
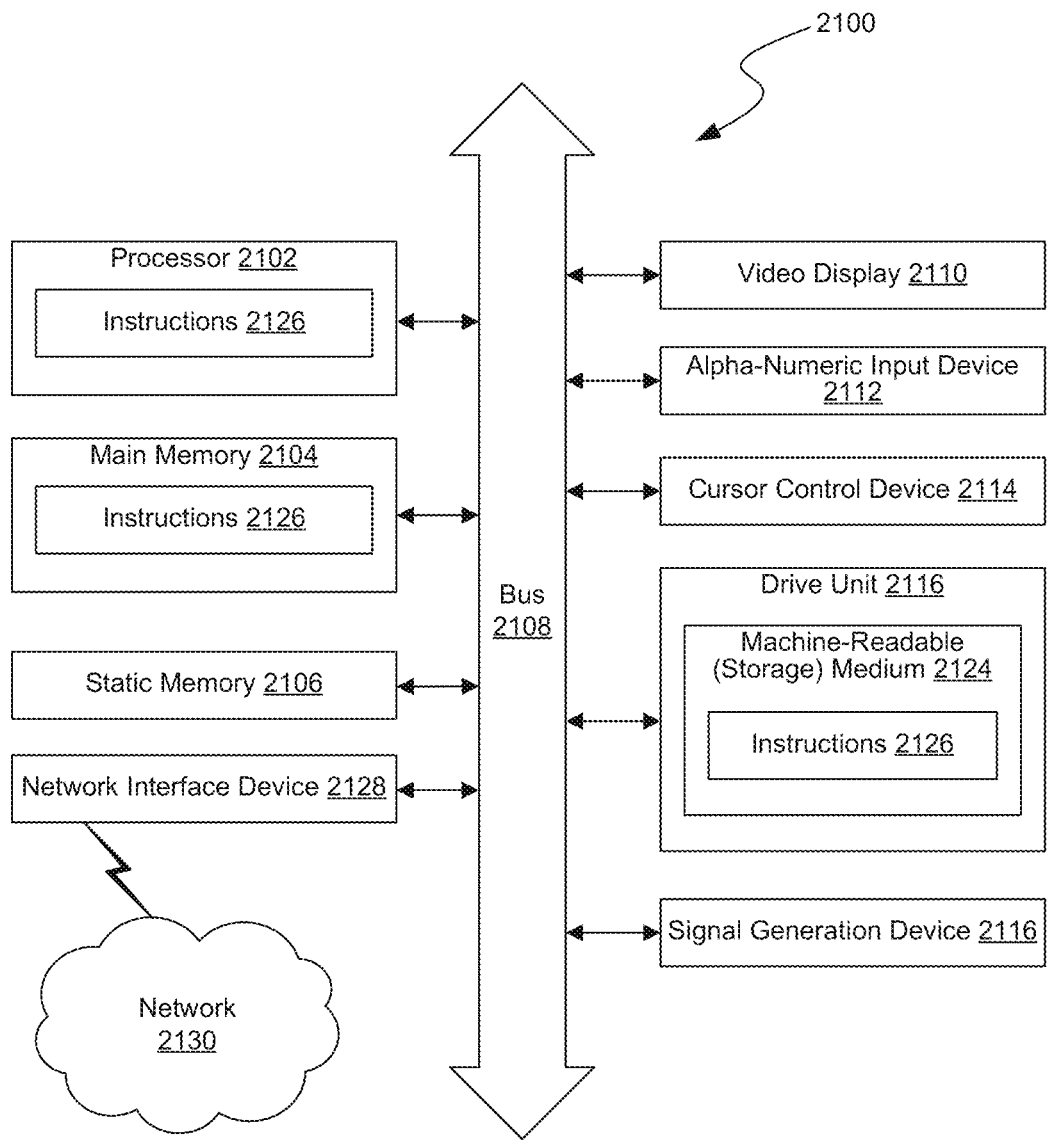
FIG. 21 is a block schematic diagram of a system in the exemplary form of a computer system, according to an embodiment of the invention.

FIG. 21 is a block schematic diagram of a system in the exemplary form of a computer system 2100 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 2100 includes a processor 2102, a main memory 2104 and a static memory 2106, which communicate with each other via a bus 2108. The computer system 2100 may further include a display unit 2110, for example, a liquid crystal display (LCD) or a cathode ray tube (CRT). The computer system 2100 also includes an alphanumeric input device 2112, for example, a keyboard; a cursor control device 2114, for example, a mouse; a disk drive unit 2116, a signal generation device 2118, for example, a speaker, and a network interface device 2128.

The disk drive unit 2116 includes a machine-readable medium 2124 on which is stored a set of executable instructions, i.e. software, 2126 embodying any one, or all, of the methodologies described herein below. The software 2126 is also shown to reside, completely or at least partially, within the main memory 2104 and/or within the processor 2102. The software 2126 may further be transmitted or received over a network 2130 by means of a network interface device 2128.

In contrast to the system 2100 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to access identity and asset risk score intelligence and to perform threat mitigation on such internet-enabled or other network-enabled devices, servers, or clients. It further should be appreciated that one or more cloud computing embodiments include access identity and asset risk score intelligence and threat mitigation using mobile devices, tablets, and the like, as such devices are becoming standard consumer devices.

An Exemplary Big Data Solution for Security and Conditions Monitoring

It has been found that one challenge facing security operations is that by the time the analysis is complete it is usually too late to take steps to mitigate the risks.

Thus, one or more embodiments provide, but are not limited to providing:

Logical-physical security convergence software with insider threat prevention that automates all aspects of enrollment, credentialing and issuance related to the airport badging office;

Situational intelligence, incident management, reporting, response and automated remediation to enhance the Airport and Security Operations Center;

Predictive analytics that connects the dots across multiple actions that now paint a much more sinister picture;

Ability to analyze huge amounts of data from disparate sources; and

Large data sets from multiple disparate sources that could pose a large problem.

Figure 22:
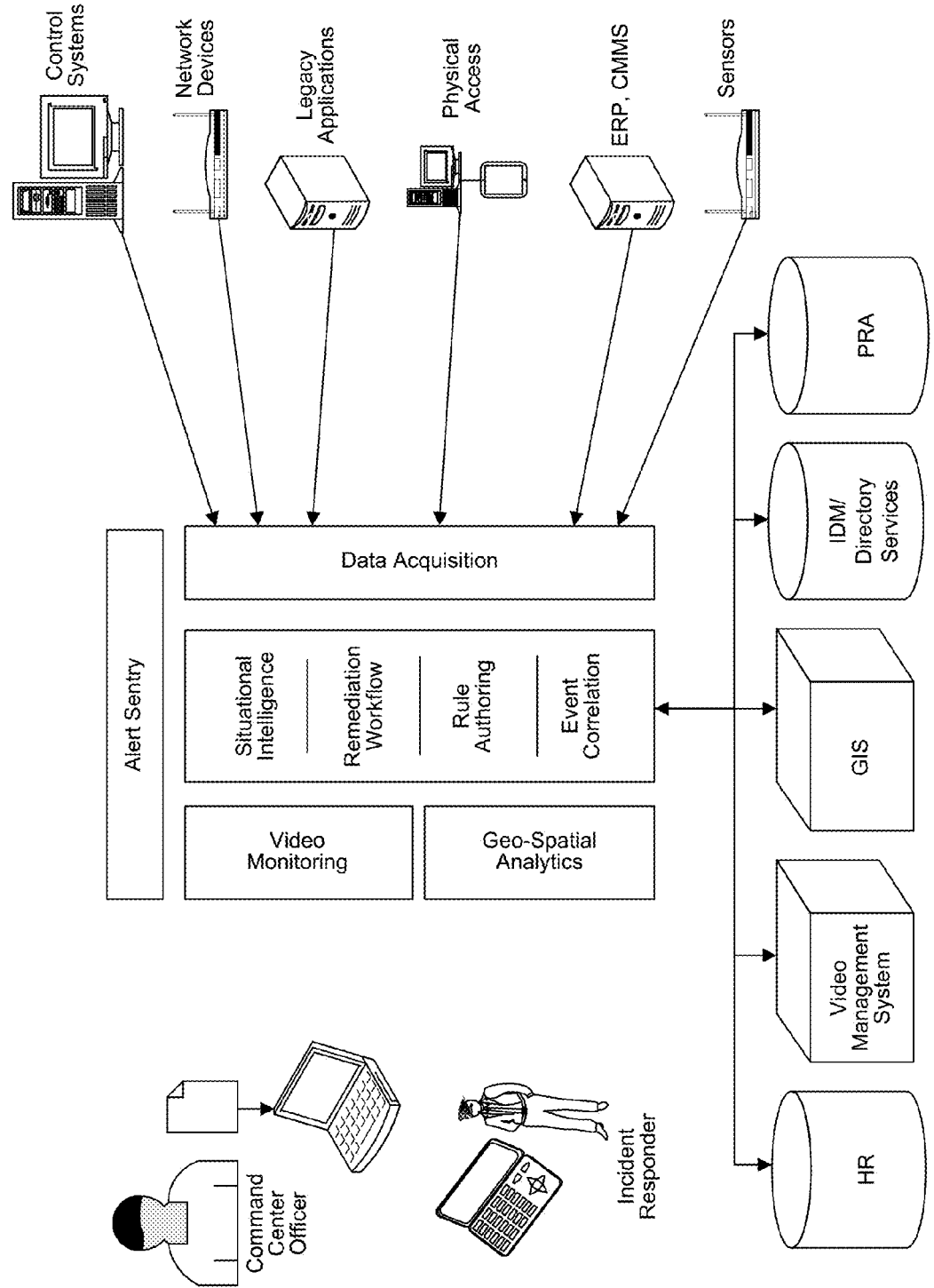
FIG. 22 is a schematic diagram of an architecture of a solution, according to an embodiment of the invention.

An embodiment can be understood with reference to FIG. 22, a schematic diagram of an architecture of a solution. Control systems, network devices, etc., provide input data into an alert sentry that hosts a situational intelligence component, remediation workflow component, rule authoring component, and event correlation component. Alert sentry is configured to provide video monitoring and geo-spatial analytics. Alert sentry is in communication with data stores and processes comprising but not limited to human resources, a video management system, etc.

Important Features.

Figure 23:
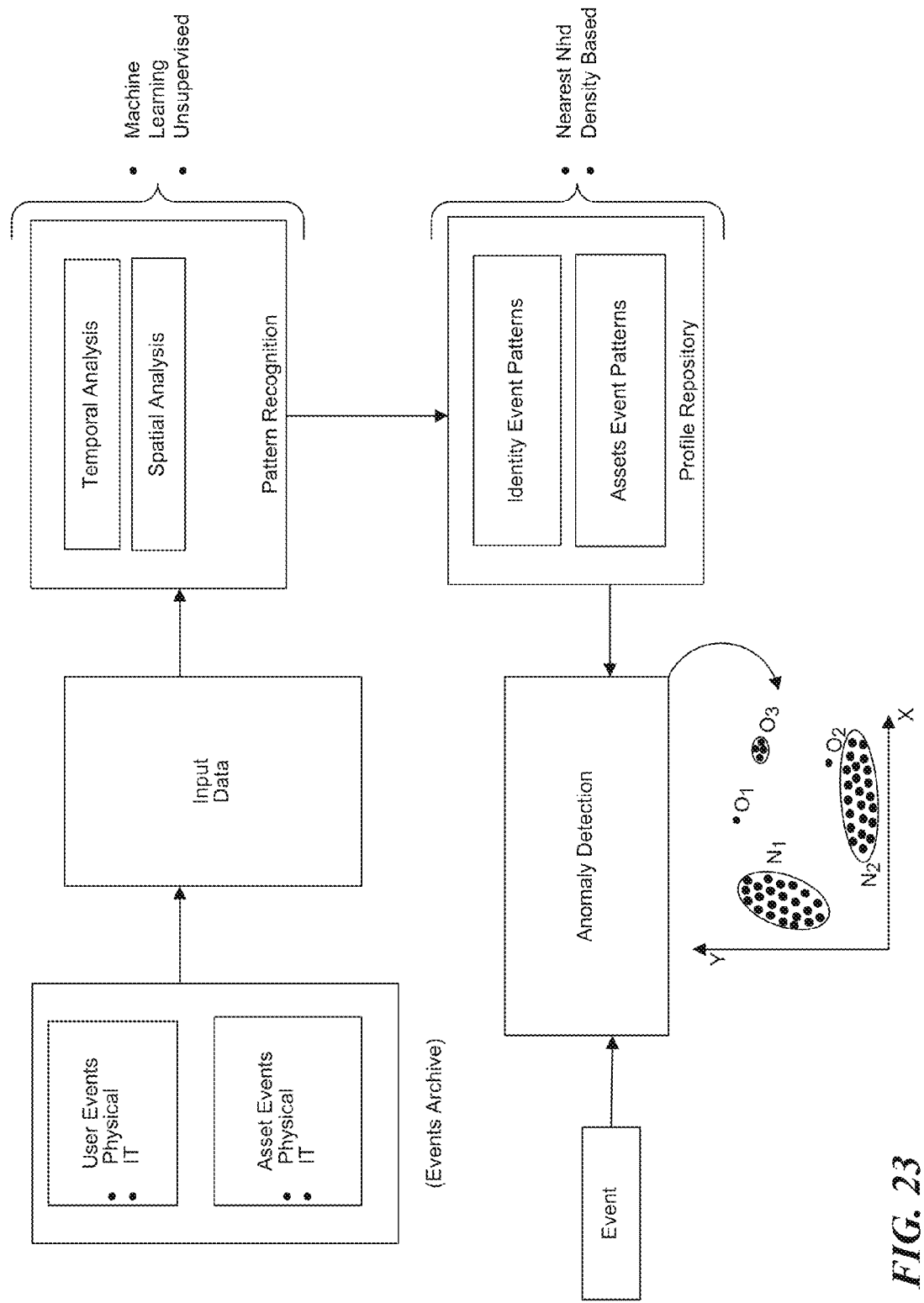
FIG. 23 is a flow diagram of anomaly detection through predictive analytics, according to an embodiment of the invention.

In an embodiment, important features include but are not limited to:

Business user friendly rule creation
Data acquisition from variety of systems
   Physical Access Control systems (AMAG, Lenel, Ccure etc.)
   IT Systems (SAP, AD, Routers, IDS etc.)
   Control Systems (SCADA, RTU, IEDs, PI etc.)
Event processing and correlation
Situational intelligence
   Video Monitoring, live and incident recording views
   Locational intelligence through geo-spatial analytics
   Personnel info and access history
   Real time views
Automated Guidance for Remediation
   Configurable remediation steps
   Automatic task completion An embodiment can be understood with reference to FIG. 23, a flow diagram of anomaly detection through predictive analytics. Events archive data are formatted into input data into a machine learning, un-supervised pattern recognition component, which sends data to a profile repository, which provides data to an anomaly detection process, which generates output, such as graphs, and which also takes in new events.

Figure 24:
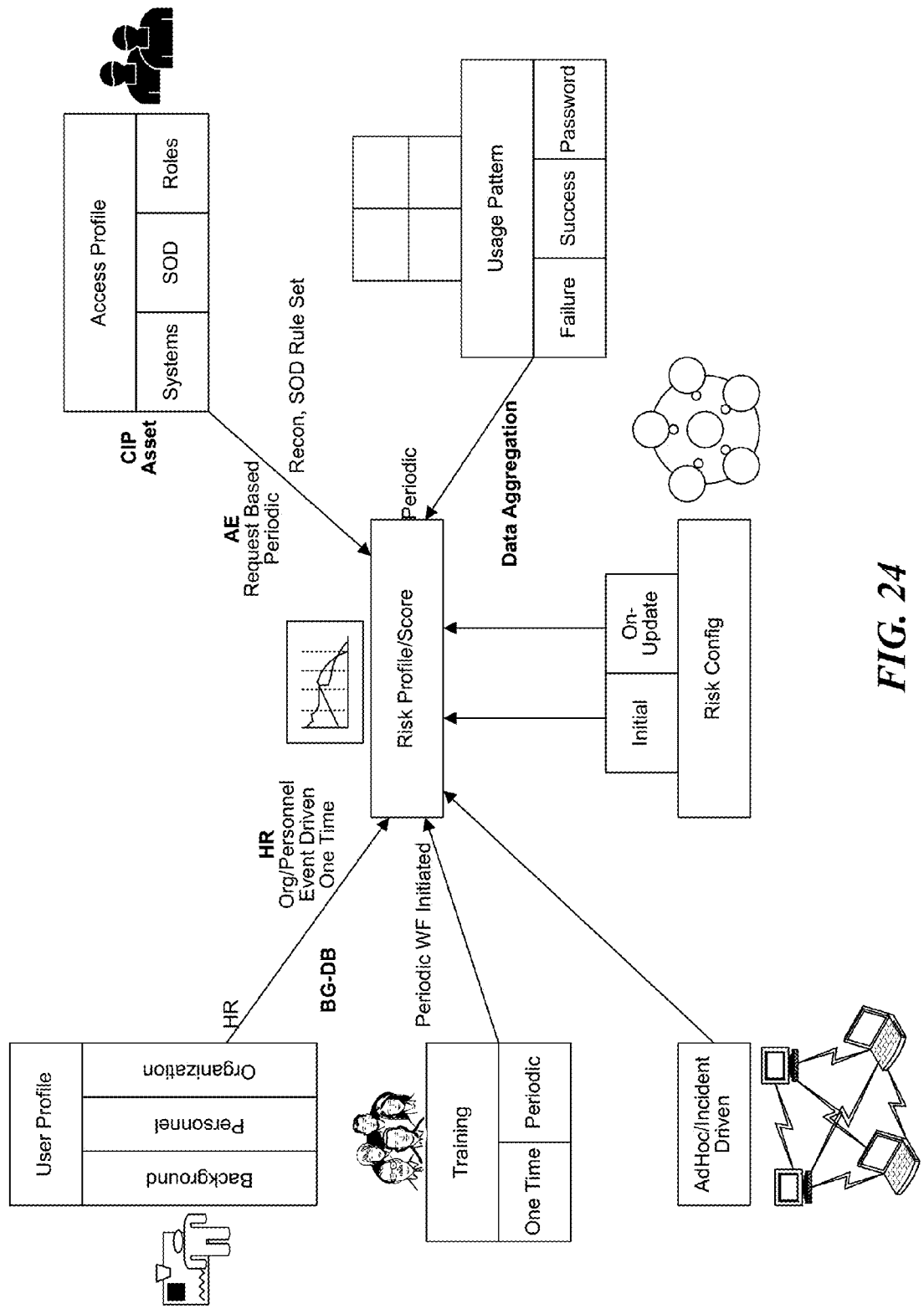
FIG. 24 is a schematic diagram showing the data and processes that interact with the risk profile/score component, according to an embodiment of the invention.

An embodiment can be understood with reference to FIG. 24, a schematic diagram showing the data and processes that interact with the risk profile/score component. It shows what data and processes are used to generate a risk score.

Figure 25:
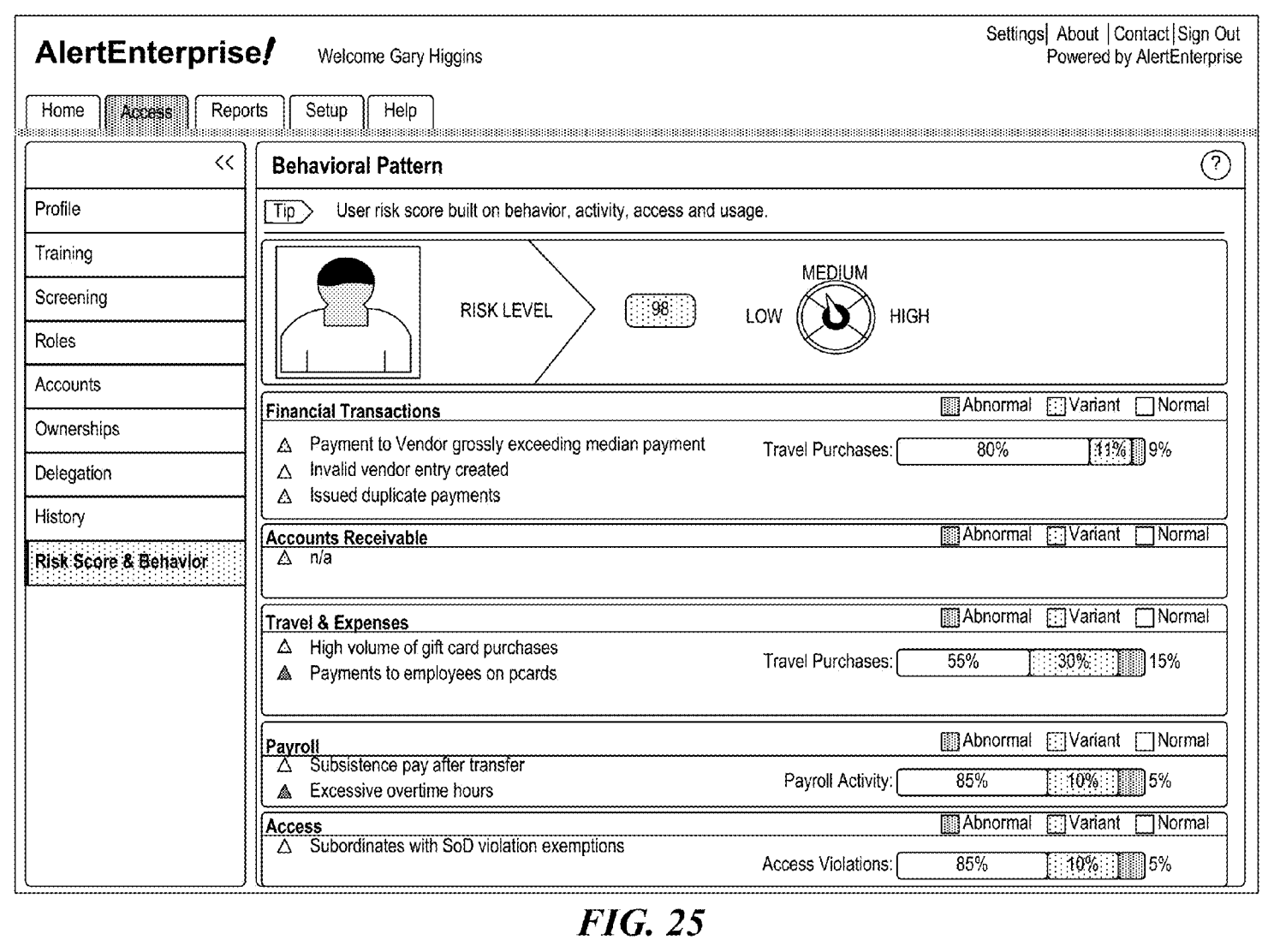

An embodiment can be understood with reference to FIG. 25, a sample screen shot showing risk score details.

Figure 26:
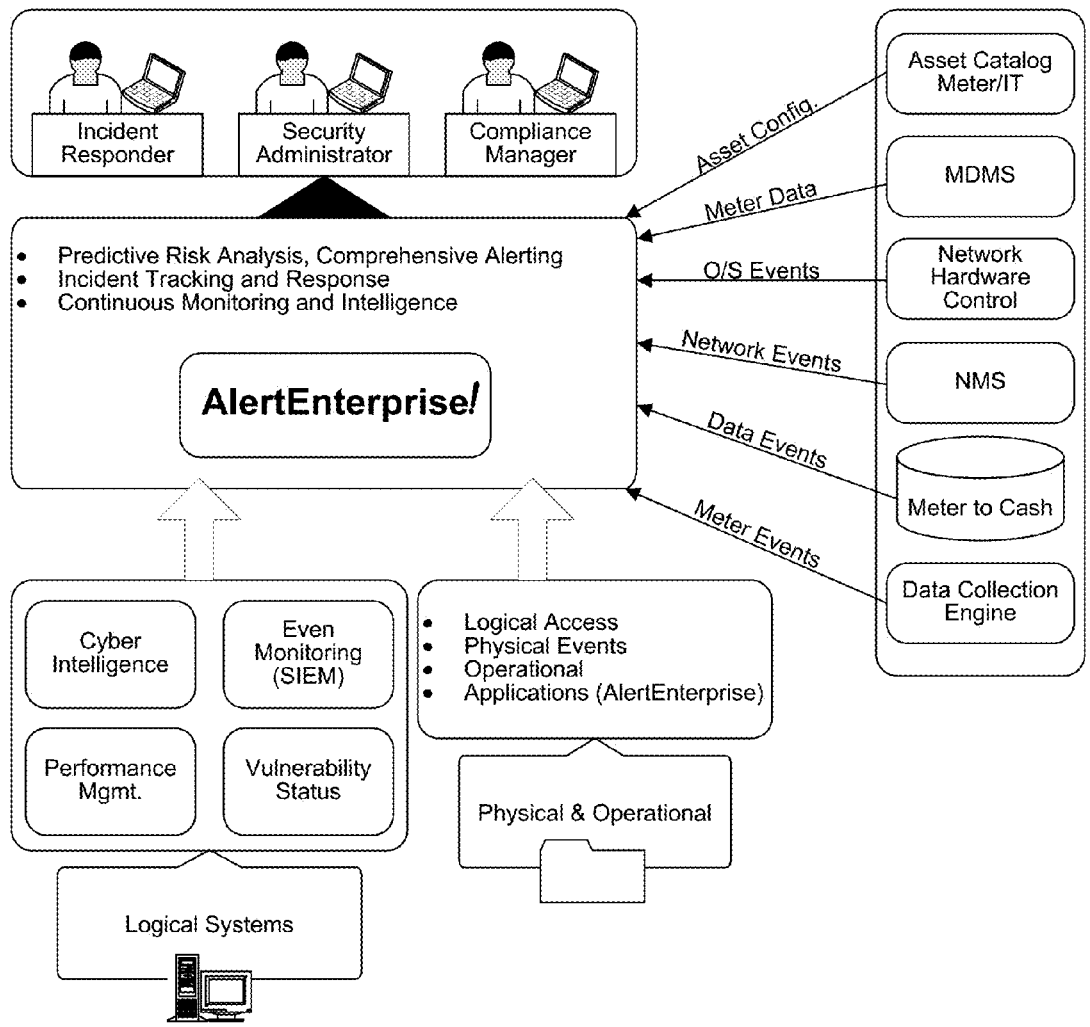
FIG. 26 is a schematic diagram showing the data and processes that contribute to a situational awareness and incident response, according to an embodiment of the invention.

An embodiment can be understood with reference to FIG. 26, a schematic diagram showing the data and processes that contribute to a situational awareness and incident response.

Figure 27:
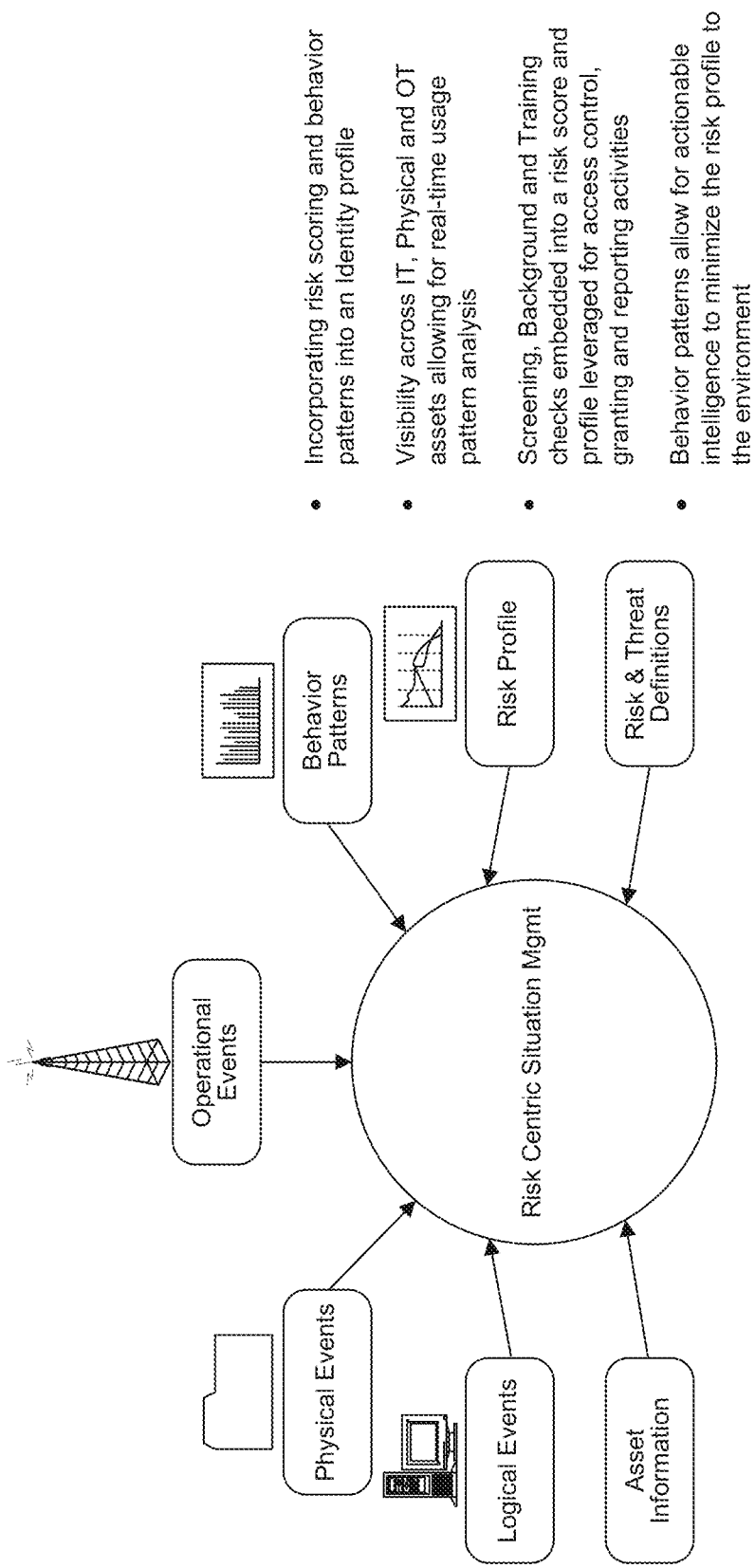
FIG. 27 is a schematic diagram showing the data and processes for a unified identity profile to enables intelligent decision making, according to an embodiment of the invention.

An embodiment can be understood with reference to FIG. 27, a schematic diagram showing the data and processes for a unified identity profile to enables intelligent decision making.

Figure 28:
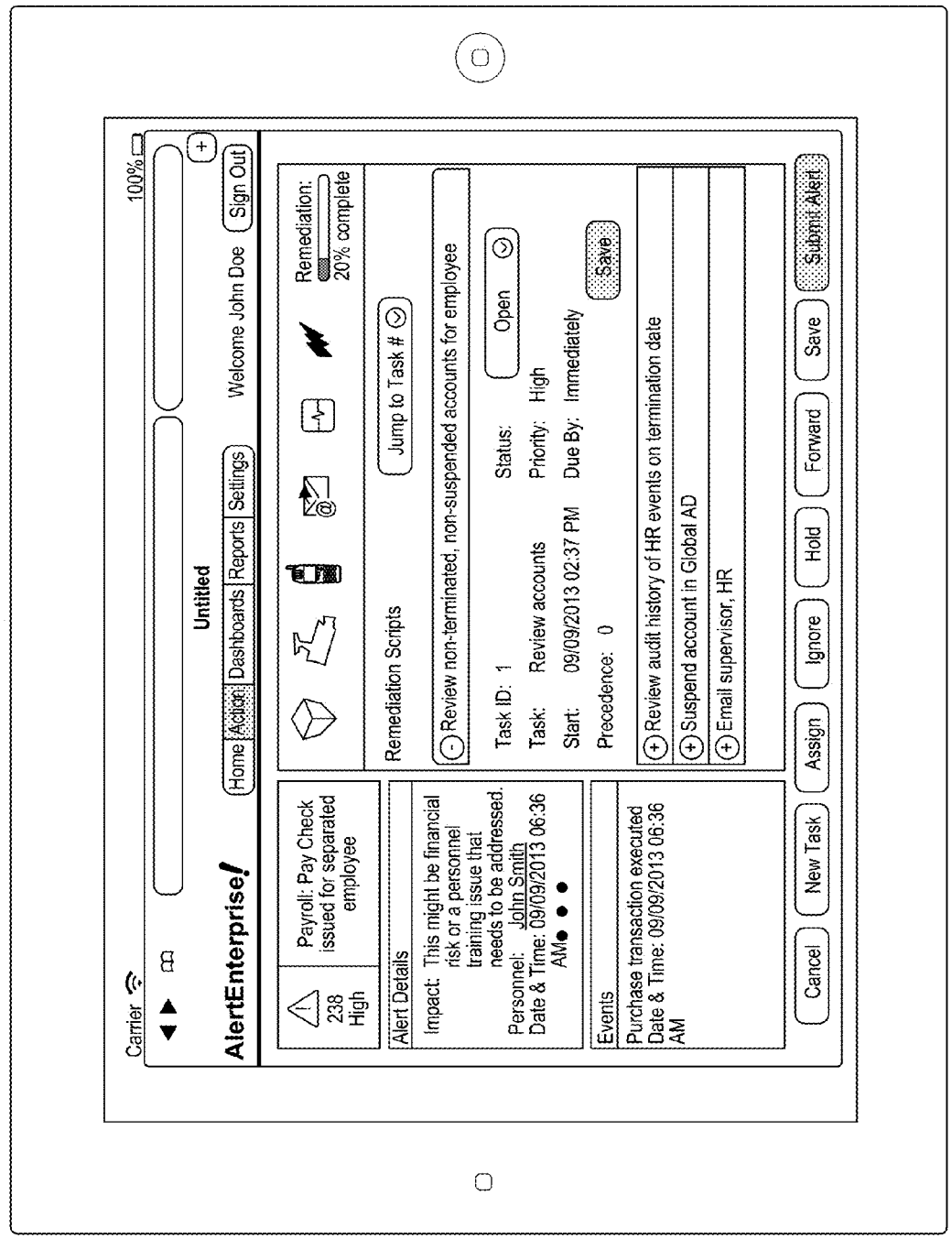
FIG. 28 is a sample screen shot of mobility solutions, according to an embodiment of the invention.

An embodiment can be understood with reference to FIG. 28, a sample screen shot of mobility solutions.

Systems, Structures, and Processes for Interconnected Devices and Risk Management Techniques are provided that produce a risk profile consisting of a risk score and trends of risk scores across devices and sensors in a machine-to-machine (M2M) or Internet of things (IOT) environment. For example, a device is assigned a risk score which is based on baseline factors such as expected network packets between two devices, normal network packets, access to critical devices, authorized access requests from one device to another device, normal communications to a device, and the critical ports of a device; access to and conflicts across physical, logical, and operational systems; historical and current usage of these systems, and anomalies from normal behavior patterns. Techniques encompass risk management by computing a risk score in a timely fashion in accordance with an architecture that enables achieving the required scaling necessitated by the huge number of devices in the machine-to-machine (M2M) or Internet of things (IOT) environment.

The identity and asset risk scoring framework provides an excellent foundational mechanism for an IOT risk management mechanism. However, because IOT includes machine-to-machine communication between a fairly large number of devices, the data volume requirement is huge and requires a scalable, high throughput and robust mechanism. Thus, in an embodiment additional risk contributing factors for IOT are incorporated into the existing identity and asset risk scoring contributing factors.

As background it has been found that in the past few years a new paradigm has emerged referred to as the Internet Of Things ("IOT"). IOT has received massive attention and adoption. IOT is combination of the interconnection of devices and sensors, etc. (things) and their data exchange (referred to as machine to machine (M2M)). M2M also includes but is not limited to remote control capability. An IOT environment enables devices to become smart. Usage of IOT is in many different industries such as energy and utility, healthcare, manufacturing, smart cities, wearable, and automotive to name a few. As per some estimates, by 2020 there will be 20 to 30 billion interconnected devices. With the pervasive use of IOT, interconnection, and wifi enabled devices, security of the devices becomes a risk, which needs to addressed by organization.

Description

Figure 29:
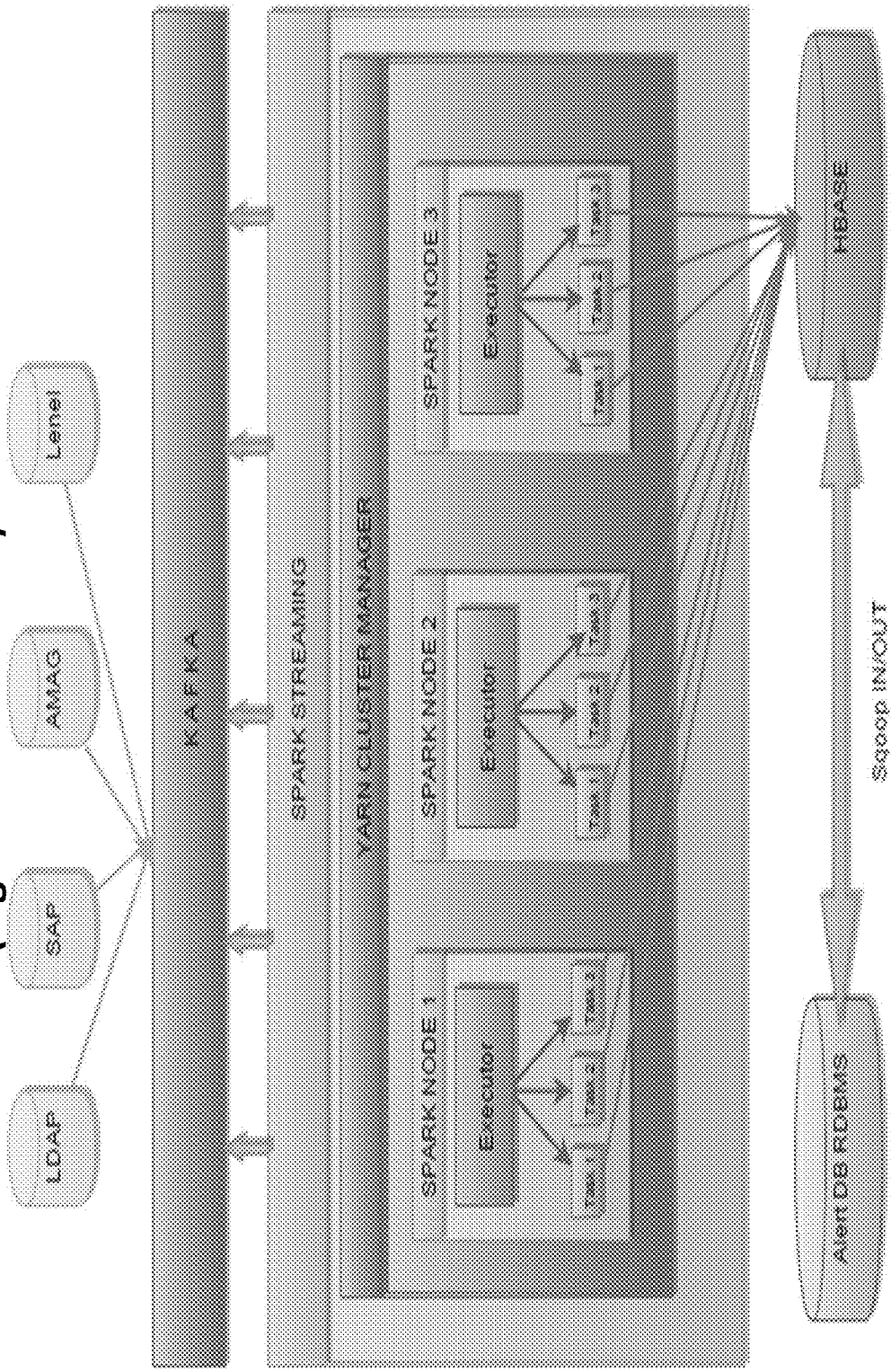
FIG. 29 is a schematic diagram showing the big data architecture, according to an embodiment of the invention.
Figure 30:
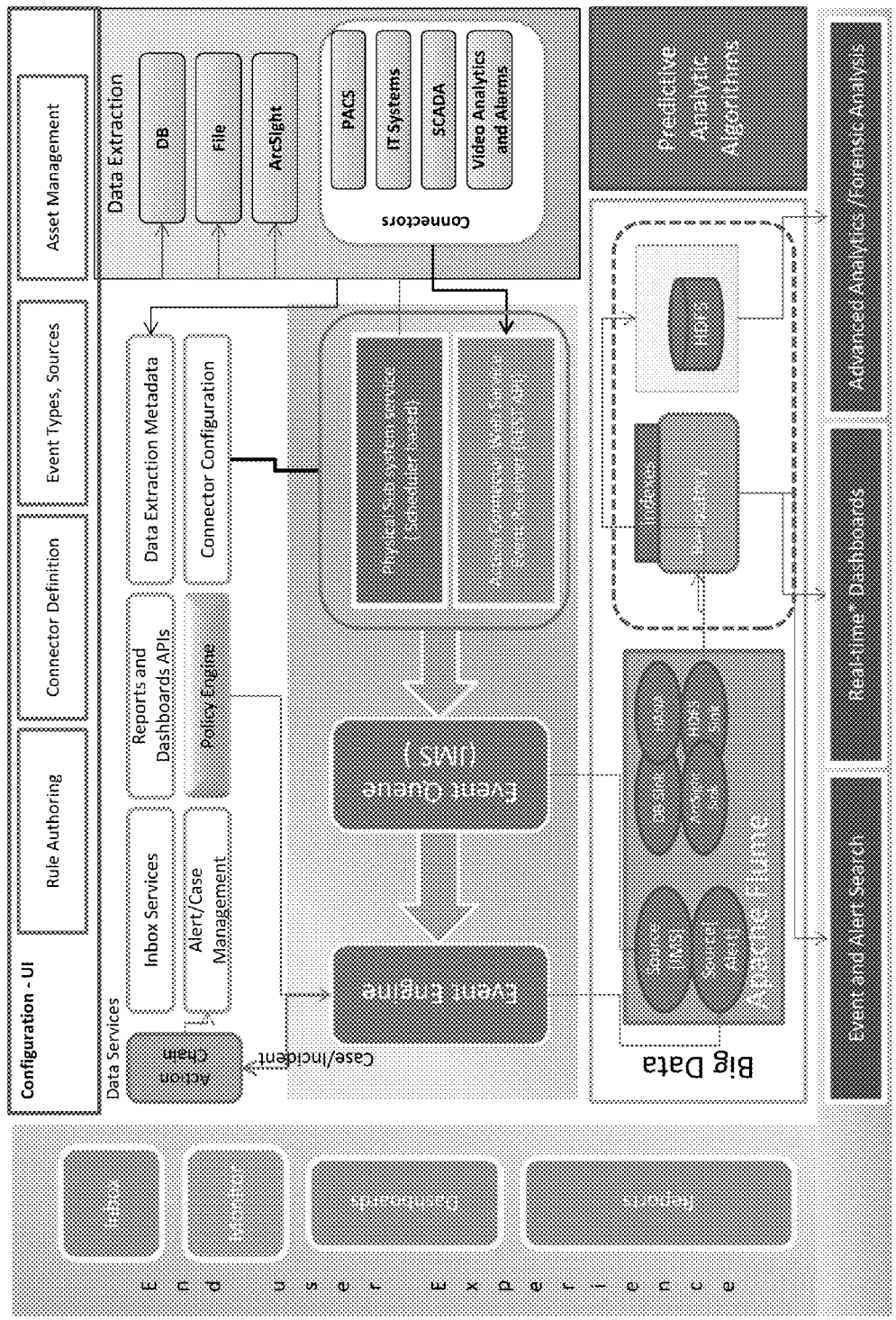
FIG. 30 is a schematic diagram showing a technical architecture, according to an embodiment of the invention.

Sensors and devices usually exchange data within sub-second intervals. When considering huge number of networked devices and each device communicating with multiple devices, the data collection volume can easily go up to petabytes of data in a day. It has been found that for risk score computation purposes, the traditional method of data collection does not scale. Traditional methods of data collection handle human to device and vice a versa. Here, one or more embodiments handle data collection methods for device to device interactions. The number of device to device interactions is vastly larger than the number of human to device interactions. Thus, a robust, fail safe, distributed and linearly scalable system is needed to handle device to device interactions in a timely manner. An embodiment can be understood with reference to FIG. 30. FIG. 30 is a schematic diagram showing a technical architecture depicting a design using a distributed and linearly scalable data collection mechanism, such as for example but not limited to Apache Flume. A distributed and linearly scalable data collection mechanism provides a conduit to acquire data from external or internal sources and transport the data in a failsafe manner to a repository that can be referred to as a sink. In an embodiment the sink can be a RDBMS, HDFS, or HBASE for example as shown at the bottom of FIG. 29. The events are stored in HBASE and the details about the assets and their relationships and other structured data are stored in the Alert DB RDBMS.

Application of predictive analytics and machine learning techniques plays a huge role in anomaly detection and potential risk incident identification. Once machine data is collected, using density based clustering techniques, any anomalous transaction in the M2M communication can be detected and contributed towards the asset risk score mechanism according to an embodiment. In an embodiment density based clustering techniques are applied to specific parameters and data corresponding to the valid devices and sensors in the IOT environment.

In an embodiment during machine data acquisition, real time analysis is performed to identify critical risks such as but not limited to an anomalous network packet between two devices. In an example implementation, Spark Streaming is a employed for the analysis processing. In an embodiment the analysis processor provides real time processing handles hundreds of thousands of events, e.g., from devices or sensors. In an embodiment a distributed message broker mechanism that provides loss less delivery is preferred. As an implementation example, KAFKA provides a distributed message broker mechanism. FIG. 29 depicts a mechanism for real-time processing and analysis of the machine data.

Following is a list of contributing factors considered as part of risk scoring computation as it pertains to IOT according to an embodiment. It should be appreciated that the list is not exhaustive.

- Unexpected network packet between two devices, e.g. detection of user datagram protocol (UDP) message between a temperature sensor and a server. For example, an intruder may be trying to inappropriately increase the temperature of a device.
- Anomalous network packet; e.g. detection of Internet control message protocol (ICMP) messages between two devices, which had not been previously detected. For example one device may be trying to determine if a server is up, which may be suspicious activity to an enterprise or organization.
- Access permission for one device to another critical device by looking at Identity Of Things (IDOT) systems. IDOT is a method or protocol for assigning unique identities to things within the IOT.
- Unauthorized access attempts from one device to another device.
- Multiple loss of communication to a device. For example the multiple loss of communication to advice could be benign or it could indicate someone or something is staging a man in the middle attack. Another example may be that someone or something is trying to tie up a server or device as another form of attack.
- Critical ports open on a device.

These and other contributing factors are used to compute a risk score for a particular device or things such as a sensor. When the risk score is high it may be indicative that the device or thing is a high risk. Knowing whether a device or thing is a high risk enables someone or some system to manage or mitigate such high risk.

Figure 31:
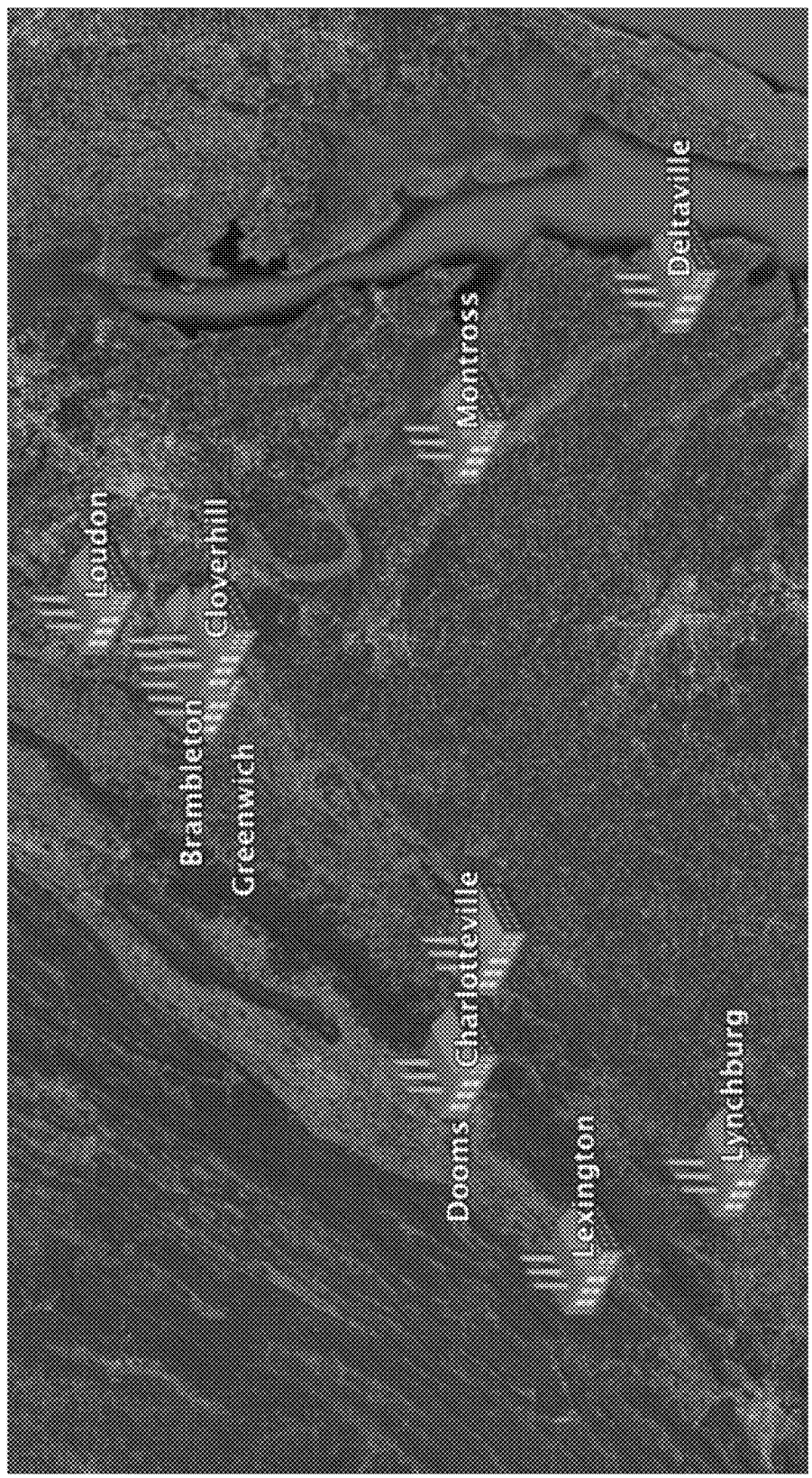
FIG. 31 is a sample screen shot of a plurality of assets potentially at risk on a geographic information system (GIS) map, according to an embodiment of the invention.
Figure 32:
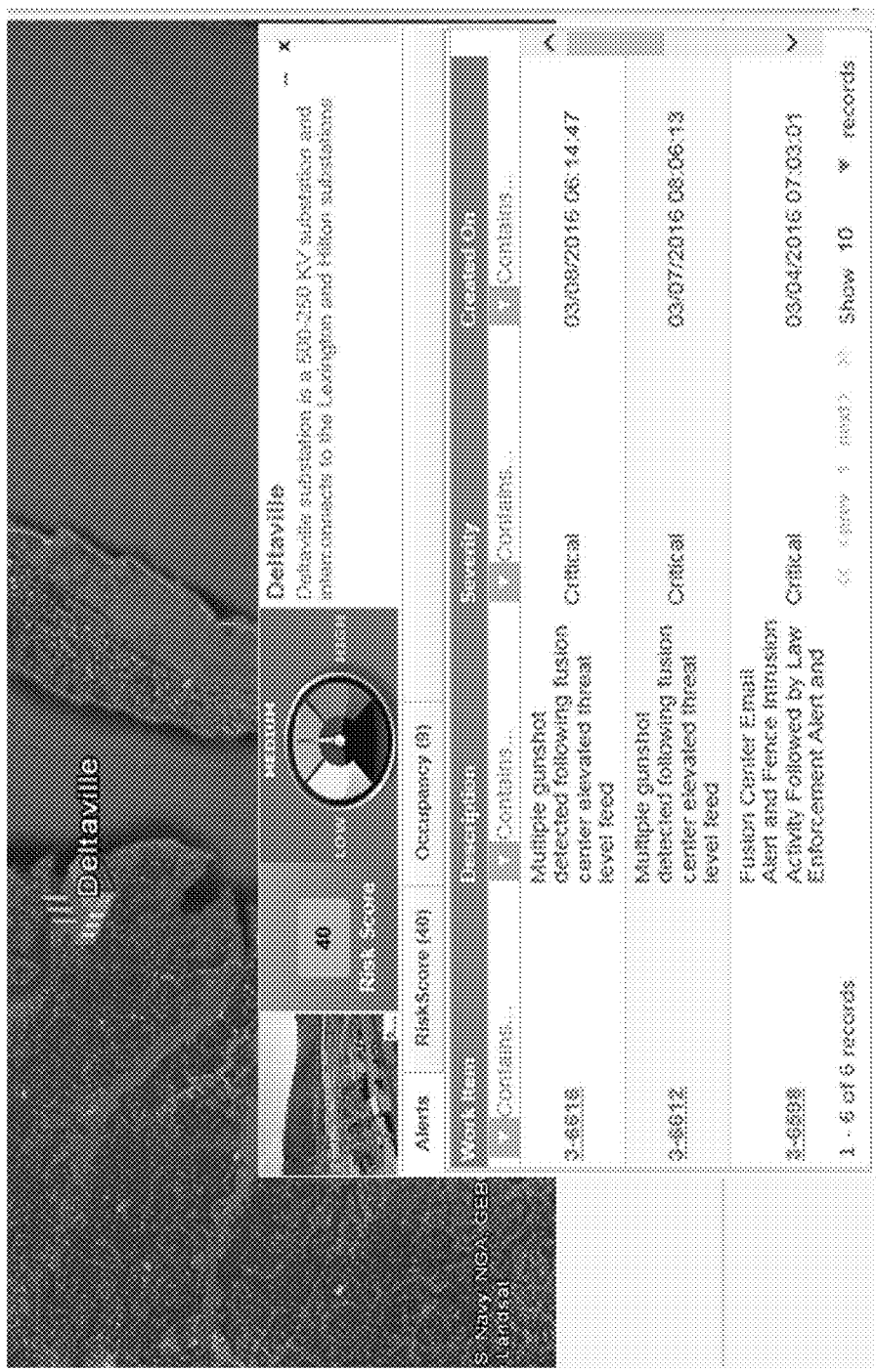
FIG. 32 is a sample screen shot of asset risk score visualization for a particular asset of FIG. 31, according to an embodiment of the invention.

FIG. 31 is a sample screen shot of a plurality of assets, e.g. devices and sensors at facilities in Loudon, Brambleton, Cloverhill, etc., potentially at risk on a geographic information system (GIS) map, according to an embodiment of the invention; and FIG. 32 is a sample screen shot of asset risk score visualization for a particular asset of FIG. 31, according to an embodiment of the invention. The user interface shows that the risk score for Deltaville is 40. A pectoral indicator depicts that such risk score indicates that the site is considered a medium risk. The interface shows that there are zero alerts a risk score of 40 and an occupancy of 9. The user interface indicates a total of six records are viewable. Data for each record include the work item number, the description, the severity and when such work item was created.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for providing entity risk score intelligence in a machine-machine environment, comprising the steps of:
   receiving baseline scoring data, associated with valid devices on a machine-machine network, at an entity warehouse, wherein the entity warehouse comprises a risk scoring and predictive analytics engine that provides entity risk score intelligence, said risk score intelligence having a risk score, regarding an entity based in part an said baseline scoring data;
   performing, at the entity warehouse, ongoing monitoring of (a) behavior and anomaly processes and data of said valid devices and (b) changes and behaviors processes and data of said valid devices, wherein each such processes and data impact the entity risk score intelligence;
   wherein said risk scoring and predictive analytics engine uses a risk score configuration on said baseline scoring data, wherein said risk score configuration comprises configurable baseline contributing factors; training and screening contributing factors; and on-going usage contributing factors;
   wherein the risk scoring and predictive analytics engine runs on a big data platform on a network and uses in-memory database processing; and
   providing system response and automatically generating real-time alerts when said risk score exceeds a defined threshold;
   wherein said risk score configuration comprises:
      profile attributes to be set, conditions for the profile attributes to be set, values for the profile attribute conditions to be set, and corresponding points to be assigned;
      training or screening conditions to be set, conditions for the training or screening to be set, values for the training or screening conditions to be set, and corresponding points to be assigned;
      on-going usage conditions to be set, conditions for the on-going usage to be set, values for the on-going usage conditions to be set, and corresponding points to be assigned; and
      setting an indicator indicating that a simulation is to be run;
   wherein one or more steps are performed on at least a processor coupled to at least a memory.

2. A system for providing entity risk score intelligence in a machine-machine environment, comprising:
   at least one processor operable to execute computer program instructions; and
   at least one memory operable to store computer program instructions executable by said at least one processor, for performing:
      receiving baseline scoring data, associated with valid devices on a machine-machine network, at an entity warehouse, wherein the entity warehouse comprises a risk scoring and predictive analytics engine that provides entity risk score intelligence, said risk score intelligence having a risk score, regarding an entity based in part an said baseline scoring data;
      performing, at the entity warehouse, ongoing monitoring of (a) behavior and anomaly processes and data of said valid devices and (b) changes and behaviors processes and data of said valid devices, wherein each such processes and data impact the entity risk score intelligence;
      wherein said risk scoring and predictive analytics engines uses a risk score configuration on said baseline scoring data, wherein said risk score configuration comprises configurable baseline contributing factors; training and screening contributing factors; and on-going usage contributing factors;
      wherein the risk scoring and predictive analytics engine runs on a big data platform on a network and uses in-memory database processing; and providing system response and automatically generating real-time alerts when said risk score exceeds a defined threshold;

wherein said risk score configuration comprises:
profile attributes to be set, conditions for the profile attributes to be set, values for the profile attribute conditions to be set, and corresponding points to be assigned;
training or screening conditions to be set, conditions for the training or screening to be set, values for the training or screening conditions to be set, and corresponding points to be assigned;
on-going usage conditions to be set, conditions for the on-going usage to be set, values for the on-going usage conditions to be set, and corresponding points to be assigned; and
setting an indicator indicating that a simulation is to be run.

3. A non-transitory storage medium having stored thereon a computer program comprising a program code for performing, when the computer program is executed on a computer, a method for providing entity risk score intelligence in a machine-machine environment, comprising the steps of:
receiving baseline scoring data, associated with valid devices on a machine-machine network, at an entity warehouse, wherein the entity warehouse comprises a risk scoring and predictive analytics engine that provides entity risk score intelligence, said risk score intelligence having a risk score, regarding an entity based in part an said baseline scoring data;
performing, at the entity warehouse, ongoing monitoring of (a) behavior and anomaly processes and data of said valid devices and (b) changes and behaviors processes and data of said valid devices, wherein each such processes and data impact the entity risk score intelligence; and
wherein said risk scoring and predictive analytics engines uses a risk score configuration on said baseline scoring data, wherein said risk score configuration comprises configurable baseline contributing factors; training and screening contributing factors; and on-going usage contributing factors;
wherein the risk scoring and predictive analytics engine runs on a big data platform on a network and uses in-memory database processing; and
providing system response and automatically generating real-time alerts when said risk score exceeds a defined threshold;
wherein said risk score configuration comprises:
profile attributes to be set, conditions for the profile attributes to be set, values for the profile attribute conditions to be set, and corresponding points to be assigned;
training or screening conditions to be set, conditions for the training or screening to be set, values for the training or screening conditions to be set, and corresponding points to be assigned;
on-going usage conditions to be set, conditions for the on-going usage to be set, values for the on-going usage conditions to be set, and corresponding points to be assigned; and
setting an indicator indicating that a simulation is to be run.

\* \* \* \* \*